United States Patent
Hu et al.

(10) Patent No.: US 12,495,376 B2
(45) Date of Patent: Dec. 9, 2025

(54) METHOD FOR DETERMINING TIME-DOMAIN RESOURCE OF UPLINK TRANSMISSION, AND TERMINAL DEVICE AND NETWORK DEVICE

(71) Applicant: GUANGDONG OPPO MOBILE TELECOMMUNICATIONS CORP., LTD., Guangdong (CN)

(72) Inventors: Yi Hu, Guangdong (CN); Haitao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 431 days.

(21) Appl. No.: 18/090,737

(22) Filed: Dec. 29, 2022

(65) Prior Publication Data
US 2023/0224840 A1  Jul. 13, 2023

Related U.S. Application Data

(63) Continuation of application No. PCT/CN2020/127589, filed on Nov. 9, 2020.

(51) Int. Cl.
*H04W 56/00* (2009.01)
*H04W 74/0833* (2024.01)
*H04W 74/0836* (2024.01)

(52) U.S. Cl.
CPC .... *H04W 56/0045* (2013.01); *H04W 74/0833* (2013.01); *H04W 74/0836* (2024.01)

(58) Field of Classification Search
CPC ......... H04W 56/0045; H04W 74/0833; H04W 72/0446; H04W 74/0836; H04W 84/06; H04B 7/18513
See application file for complete search history.

(56) References Cited

U.S. PATENT DOCUMENTS

2018/0098360 A1\* 4/2018 Vos ................... H04W 56/0045
2020/0196263 A1\* 6/2020 Heyn ................ H04W 56/0005
(Continued)

FOREIGN PATENT DOCUMENTS

CN    108289325 A    7/2018
CN    111565472 A    8/2020
(Continued)

OTHER PUBLICATIONS

Extended European Search Report for EP Application 20960503.9 mailed Dec. 1, 2023. (11 pages).
(Continued)

*Primary Examiner* — Kwang B Yao
*Assistant Examiner* — Bradley D Lytle, Jr.
(74) *Attorney, Agent, or Firm* — Young Basile Hanlon & MacFarlane, P.C.

(57) ABSTRACT

Provided are a method for determining a time-domain resource of uplink transmission, and a terminal device, a network device and a computer-readable storage medium, which are used to avoid an increase in the more signaling overheads and can achieve accurate control over a slot offset of uplink transmission. Also provided is a terminal device determining, according to whether the terminal device has a timing advance (TA) pre-compensation capability, a target slot offset used for uplink scheduling.

12 Claims, 10 Drawing Sheets

Without Timing advance

(56) References Cited

U.S. PATENT DOCUMENTS

2022/0086780 A1* 3/2022 Tsai .................. H04W 56/006
2023/0056527 A1* 2/2023 Medles .............. H04W 56/009

FOREIGN PATENT DOCUMENTS

| | | |
|---|---|---|
| CN | 111757435 A | 10/2020 |
| WO | 2020031120 A2 | 2/2020 |
| WO | 2020182006 A1 | 9/2020 |

OTHER PUBLICATIONS

OPPO, Consideration on MAC enhancement for NTN, 3GPP TSG-RAN WG2 Meeting #111, R2-2006781, Aug. 17-28, 2020. (11 pages).

ZTE, Discussion on timing relationship enhancements for NR-NTN, 3GPP TSG RAN WG1 #103-e, R1-2008850, Oct. 26-Nov. 13, 2020. (6 pages).

3rd Generation Partnership Project; Technical Specification Group Radio Access Network; Solutions for NR to support non-terrestrial networks (NTN)(Release16), 3GPP Standard; Technical Report; 3GPP TR38.821,3rd Generation Partnership Project(3GPP), Mobile Competence Centre; 650, Route Des Lucioles; F-06921 Sophia-Antipolis Cedex; France, vol. RAN WG3, No. v16.0.0, Jan. 16, 2020 (Jan. 16, 2020), pp. 1-140, XP051860814, Retrieved from the Internet: <URL:ftp://ftp.3gpp.org/Specs/archive/38_series/38.821/38821-g00.zip.

InterDigital (email discussion Rapporteur), Summary of [AT111][107][NTN] Pre-compensation and other MAC issues, 3GPP RAN WG2 Meeting #111e, R2-2008188, Aug. 17-28, 2020. (64 pages).

International Search Report and Written Opinion with English Translation for PCT Application PCT/CN2020/127589 mailed Aug. 6, 2021. (15 pages).

Nokia, Nokia Shanghai Bell, Timing Advance, Random Access and DRX aspects in NTN, 3GPP TSG-RAN WG2 Meeting #111 Electronic, R2-2007590, Aug. 17-28, 2020. (9 pages).

* cited by examiner

METHOD FOR DETERMINING TIME-DOMAIN RESOURCE OF UPLINK TRANSMISSION, AND TERMINAL DEVICE AND NETWORK DEVICE

CROSS-REFERENCE TO RELATED APPLICATION(S)

The present disclosure is a continuation-application of International (PCT) Patent Application No. PCT/CN2020/127589, filed on Nov. 9, 2020, the entire contents of which are hereby incorporated by reference in their entirety.

TECHNICAL FIELD

The present disclosure relates to the field of communication technologies, and in particular to a method for determining time-domain resource of uplink transmission, a terminal device, a network device, and a computer-readable storage medium.

BACKGROUND

In traditional new radio (NR) terrestrial cellular networks, the cell coverage is small, the signal propagation delay between user equipment (UE) and network device is small, and therefore the timing advance (TA) value of UE is also small, being less than the maximum values of k2 and k1 currently supported. The signal propagation delay between the UE and satellite in non-terrestrial network (NTN) devices is substantially greater compared to the cellular network applied in conventional NR. For the low-earth orbit (LEO) scenario, the maximum round-trip signal transmission time between the UE and the network device is 25.77 ms; and for the geostationary earth orbit (GEO) scenario, the maximum round-trip signal transmission time between the UE and the network device is 541.46 ms. This means that the maximum TA of the UE in NTN is 541.46 ms. This TA value is much greater than the maximum values of k2 and k1 that can be supported in the current standard.

To address the problem, the radio access network (RAN)1 has agreed to introduce a k offset for k2 and k1 The k offset is configured to compensate for the greater TA used by UE in the NTN. No conclusions have been reached on how to determine the k offset.

SUMMARY

The present disclosure to provides a method for determining time-domain resource of uplink transmission, a terminal device, a network device, and a computer-readable storage medium, for avoiding adding more signaling overhead and enabling accurate control of time slot offsets for uplink transmission.

In a first aspect, the present disclosure provides a method for determining a time-domain resource of uplink transmission, comprising: determining, by a terminal device, a target time slot offset used for uplink scheduling based on whether the terminal device has a timing advance (TA) pre-compensation capability.

In a second aspect, the present disclosure provides a method for determining a time-domain resource of uplink transmission, comprising: determining, by a terminal device, a timing advance (TA) of the terminal device as a target time slot offset used for uplink scheduling.

In a third aspect, the present disclosure provides a method for determining a time-domain resource of uplink transmission, comprising: obtaining, by a network device, a target time slot offset used for uplink scheduling, wherein the target time slot offset is determined by a terminal device based on whether the terminal device has a timing advance (TA) pre-compensation capability.

In a fourth aspect, the present disclosure provides a method for determining a time-domain resource of uplink transmission, comprising: obtaining, by a network device, a target time slot offset used for uplink scheduling, wherein the target time slot offset is a timing advance (TA) of a terminal device determined by the terminal device.

The present disclosure further provides a terminal device with a function to avoid adding more signaling overhead and to achieve an accurate control of the time slot offset for uplink transmission. The function may be implemented by hardware or by hardware executing corresponding software. The hardware or software includes one or more modules corresponding to the above functions.

The present disclosure further provides a network device with a function to avoid adding more signaling overhead and to achieve an accurate control of the time slot offset for uplink transmission. The function may be implemented by hardware or by hardware executing corresponding software. The hardware or software includes one or more modules corresponding to the above functions.

The present disclosure further provides a terminal device including: a memory in which an executable program code is stored; a processor and a transceiver coupled to the memory; the processor and the transceiver for correspondingly executing the method described in the first aspect or the second aspect of the present disclosure.

The present disclosure further provides a network device including: a memory in which an executable program code is stored; and a transceiver coupled to the memory; the transceiver for executing the method described in the third aspect or the fourth aspect of the present disclosure.

The present disclosure further provides a non-transitory computer-readable storage medium including an instruction which, when the instruction is executed on a computer, the computer is caused to perform a method as described in the first aspect or the second aspect or the third aspect or the fourth aspect of the present disclosure.

The present disclosure further provides a computer program product including an instruction which, when run on a computer, causes the computer to perform a method as described in the first aspect or the second aspect or the third aspect or the fourth aspect of the present disclosure.

The present disclosure further provides a chip coupled to a memory in a terminal device, such that the chip calls, at runtime, program instructions stored in the memory, causing the terminal device to perform the method described in the first aspect or the second aspect of the present disclosure.

The present disclosure further provides a chip coupled to a memory in a network device, such that the chip calls, at runtime, program instructions stored in the memory, causing the network device to perform the method described in the third aspect or the fourth aspect of the present disclosure.

In the technical solution provided by the embodiments of the present disclosure, the terminal device determines the target time slot offset used for uplink scheduling based on whether the terminal device has the TA pre-compensation capability, which may avoid adding more signaling overhead and achieve accurate control of the time slot offset for uplink

DETAILED DESCRIPTION

Figure 1A:
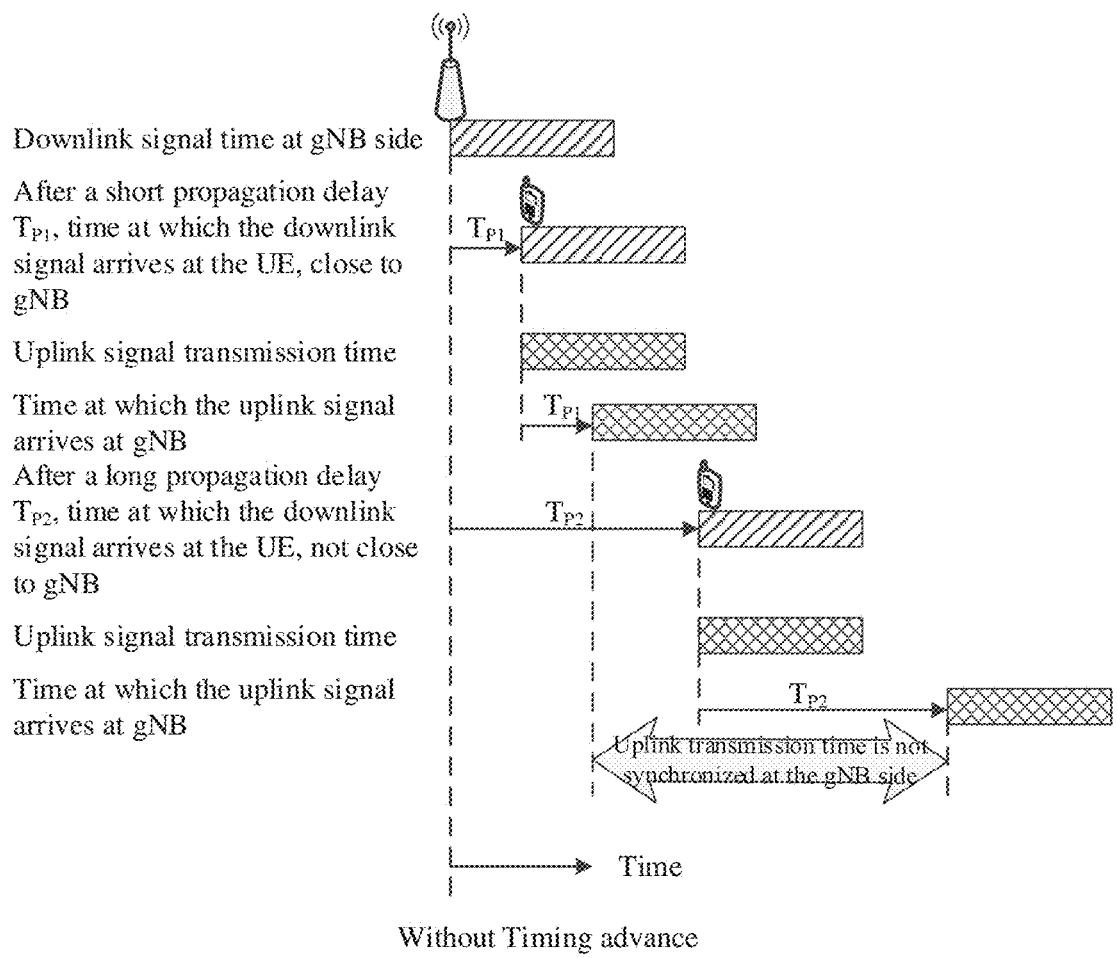
FIG. 1A is a schematic view of time synchronization on the gNB side in the related art.

The technical solutions in the embodiments of the present disclosure will be described below in conjunction with the accompanying drawings in the embodiments of the present disclosure. Obviously, the embodiments described are only a part of the embodiments of the present disclosure, and not all of them. Based on the embodiments in the present disclosure, all other embodiments obtained by those skilled in the art without making creative labor fall within the scope of the present disclosure.

A brief description of some of the terms involved in the present disclosure is first given below, as follows.

1. Non Terrestrial Network (NTN) Related Background

The study of NR systems includes Non-Terrestrial Network (NTN) technology, which generally uses satellite communications to provide communication services to terrestrial users. Compared with terrestrial cellular network communication, satellite communication has many unique advantages. First, satellite communication is not limited by the user's geographical location. For example, general terrestrial communication cannot cover areas such as oceans, mountains, deserts, etc. where communication device cannot be set up or where communication coverage is not done due to sparse population, while for satellite communication, a single satellite can cover a large area of the ground, and since satellites can orbit around the earth, theoretically every corner of the earth can be covered by satellite communication. Second, satellite communication has a greater social value. Satellite communication can cover remote mountainous areas, poor and backward countries or regions at a lower cost, such that people in these regions can enjoy advanced voice communication and mobile Internet technology, which is conducive to narrowing the digital divide with developed regions and promoting the development of these regions. In addition, the communication distance of satellite communication is long, and the cost of communication does not increase significantly. Moreover, the stability of satellite communication is high and not subject to natural disasters.

Communication satellites are divided into a low-earth orbit (LEO) satellite, a medium-earth orbit (MEO) satellite, a geostationary earth orbit (GEO) satellite, and a high elliptical orbit (HEO) satellite, etc. according to their orbital altitude. At the present stage, LEO and GEO are mainly studied.

For LEO satellites, the orbital altitude range is 500 km-1500 km, and the corresponding orbital period is about 1.5 hours-2 hours. The signal propagation delay of single-hop communication between terminals is generally less than 20 ms, and the maximum satellite visualization time is 20 minutes. The signal propagation distance is short, the link loss is low, and the transmitting power requirement for the terminal is not high.

For GEO satellites, the orbit altitude is 35786 km and the rotation period around the earth is 24 hours. The signal propagation delay for single-hop communication between users is typically 250 ms.

In order to ensure satellite coverage and enhance the system capacity of the entire satellite communication system, satellites use multiple beams to cover the ground, and a satellite may form dozens or even hundreds of beams to cover the ground; a satellite can cover a ground area of dozens to hundreds of kilometers in diameter.

2. New Radio (NR) Uplink Timing Advance (TA)

An important feature of uplink transmission is the orthogonal multiple access of different user equipment (UE) in time and frequency, i.e., no interference between the uplink transmissions of different UEs from the same cell.

To ensure the orthogonality of uplink transmission and avoid intra-cell interference, the new generation Node B (gNB) requires that the signals from different UEs of the same moment but different frequency domain resources arrive at the gNB with essentially aligned time. In order to ensure the time synchronization on the gNB side, NR supports the mechanism of uplink timing advance.

Figure 1B:
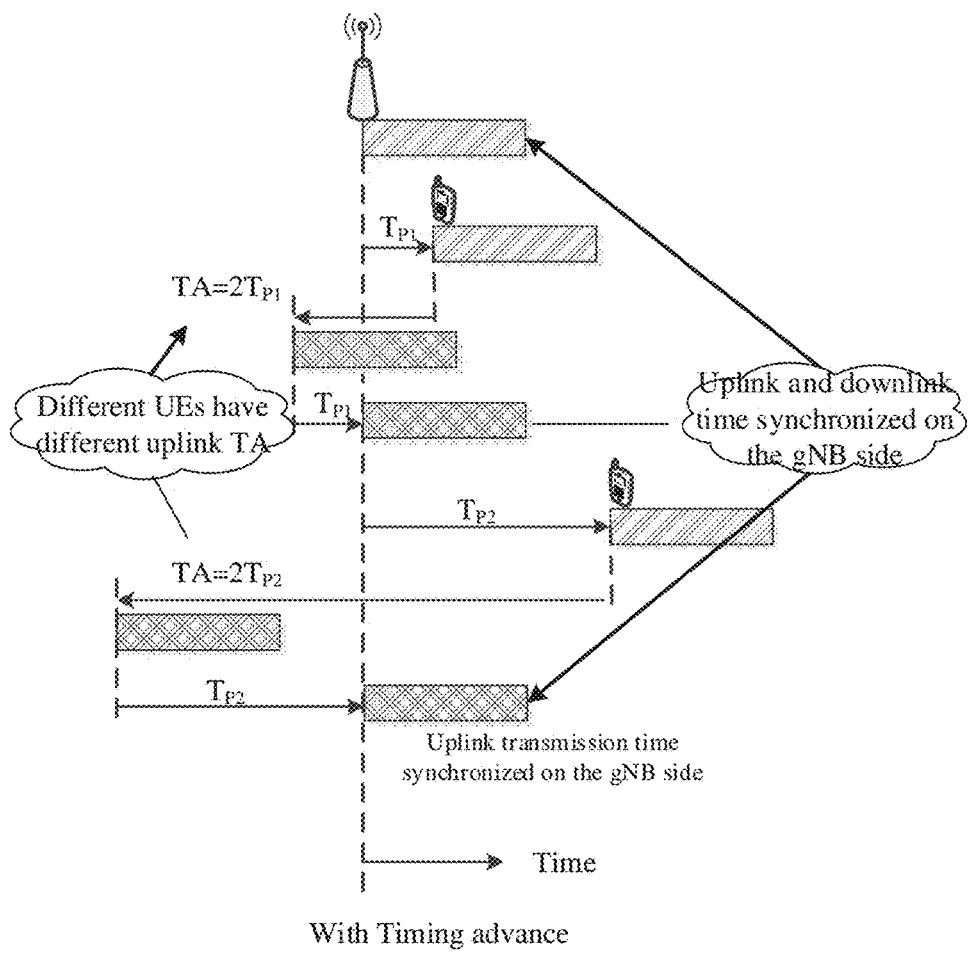
FIG. 1B is another schematic view of time synchronization on the gNB side in the related art.

The uplink and downlink clocks on the gNB side are the same, while there are offsets between the uplink and downlink clocks on the UE side, and different UEs have their own uplink timing advance. gNB can control the time when the uplink signals from different UEs arrive at gNB by properly controlling the offset of each UE. For UEs that are farther away from the gNB, they have to send uplink data earlier than UEs that are closer to the gNB because of the larger transmission delay. As shown in FIG. 1A. FIG. 1A is a schematic view of time synchronization on the gNB side in the related art. As shown in FIG. 1B, FIG. 1B is another schematic view of time synchronization on the gNB side in the related art.

The gNB determines the TA value of each UE based on measuring the uplink transmission of the UE. gNB sends TA commands to the UE in two ways.

(1) obtaining initial timing advance (TA): In a random-access process, the gNB determines the TA value by measuring the received random access preamble and sends it to the UE through the uplink timing advance command field of the random access response (RAR).

(2) adjusting radio resource control (RRC) connection state TA: although the UE achieves uplink synchronization with the gNB during the random-access process, the timing of the uplink signal arriving at the gNB may change with time; therefore, the UE needs to constantly update its uplink timing advance to maintain uplink synchronization. When the TA of a UE is required to be corrected, the gNB will send a timing advance command to the UE and request the UE to adjust the uplink timing. The timing advance command is sent to the UE via a timing advance command medium access control (MAC) control element (CE).

3. NTN Four-Step Random-Access Process

Based on the current NTN standardization discussion, all UEs in NTN should have positioning capability, and two types of UEs will be supported in NTN: one is UE without initial TA compensation capability, i.e., the UE uses the common TA broadcast by the network device for TA compensation when sending Msg1 during the random-access process, and the other is UE with initial TA compensation capability, i.e., the UE uses its own estimated TA to send Msg1 during the random-access process. For these two types of UEs, methods for determining the initial TA are different.

Figure 1C:
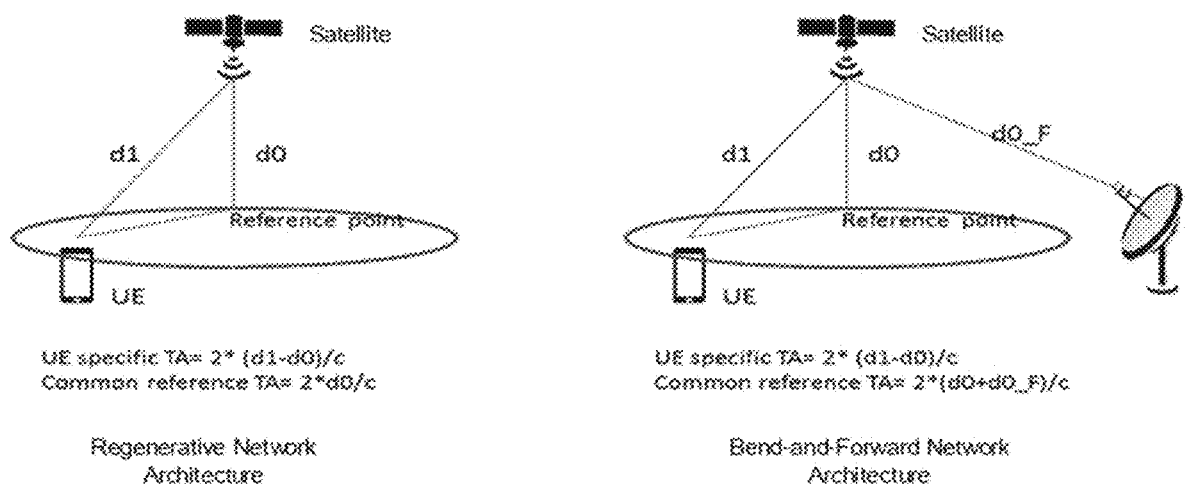
FIG. 1C is a schematic view of a common TA and a UE exclusive TA.

For UEs that do not have the initial TA compensation capability, the network device broadcasts one common TA based on the signal transmission delay between the perigee and the base station. As shown in FIG. 1C, for the regenerative network architecture, the UE's own TA (specific TA)=2*(d1−d0)/c, and common TA (common reference TA)=2*d0/c; for the bent-type forwarding network architecture UE's own TA=2*(d1−d0)/c, and common TA (common reference TA)=2*(d0+d0_F)/c; where d1 is the distance from satellite to UE, d0 is the distance from satellite to ground reference point, and df is the distance from satellite to ground base station. The UE sends preamble with TA compensation using the common TA broadcasted by the network device, and the network device indicates a UE exclusive TA value to the UE in the RAR, such that the initial TA of the UE is a result of the accumulation of both the broadcasted common TA and the UE exclusive TA indicated in the RAR.

Figure 1D:
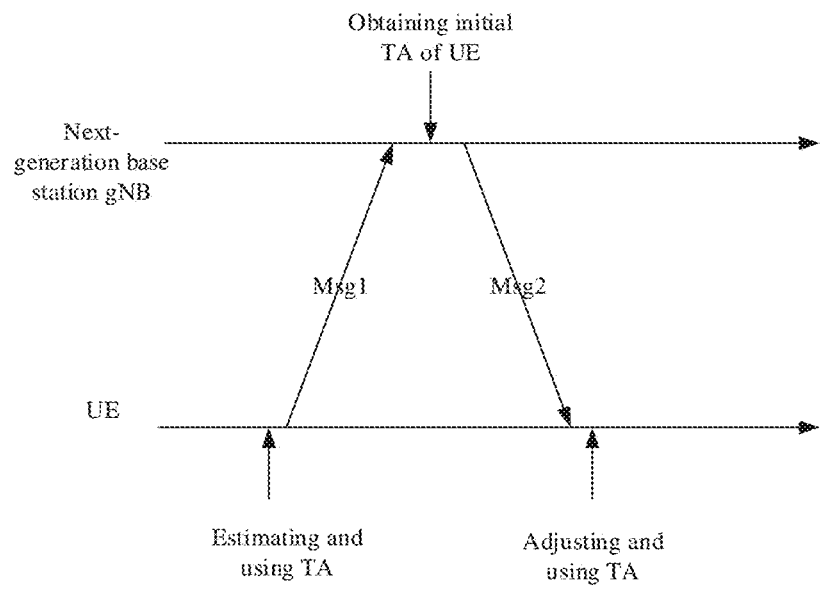
FIG. 1D is a schematic view of a random-access process for a terminal with initial TA compensation capability.

For the terminal with initial TA compensation capability, the random-access process is shown in FIG. 1D.

Step 1: The UE estimates its own TA based on the location capability and sends a msg1 with the estimated TA.

Step 2: After receiving the msg1, the network device determines a TA adjustment value of the UE and indicates it to the UE via a msg2. Since the network device does not know the exact TA value of the UE at this time, the network device can schedule resources of a msg3 of the UE according to a maximum uplink scheduling delay.

Step 3: The UE adjusts the TA based on instructions received from the RAR and sends the msg3 on uplink resources scheduled by the network device.

Step 4: The network device can know the initial TA used by the UE after receiving the msg3 from the UE, and since then the network device side and the UE side have the same understanding of the TA value of the UE.

During the four-step random-access process, the RAR sent by the network device contains an uplink grant (UL grant) field for scheduling the uplink resource indication for the msg3, regardless of whether the UE has the initial TA compensation capability. The UE sends the msg3 on the PUSCH resource indicated by the UL grant of the RAR. If the UE receives the RAR at time slot n, the UE sends the msg3 at time slot n+k$_2$+Δ, where k2 is indicated through the UL grant and the value of is taken with respect to an uplink subcarrier interval.

4. UE Determining Physical Uplink Shared Channel (PUSCH) Time Domain Resources

The uplink scheduler at the gNB side informs the UE of the scheduling information through the physical downlink control channel (PDCCH) after the PUSCH resource allocation, including the time domain resource allocation information, frequency domain resource allocation information, modulation and coding scheme (MCS), used uplink hybrid automatic repeat request (HARQ) process number, etc.

If the UE receives the PDCCH in subframe n, the UE sends the PUSCH at time slot $$\left\lfloor n \cdot \frac{2^{\mu_{PUSCH}}}{2^{\mu_{PDCCH}}} \right\rfloor + K_2,$$

where K2 is indicated via the PDCCH, and $\mu_{PUSCH}$ and $\mu_{PDCCH}$ are the subcarrier interval of the PUSCH and PDCCH, respectively.

5. UE Determining PUCCH Time Domain Resource for Acknowledge (ACK)/not Acknowledge (NACK) Feedback For physical downlink shared channel (PDSCH) transmissions, the UE needs to detect the PDSCH reception and inform the gNB of the detection result, i.e., sending the ACK/NACK feedback to the gNB. The physical uplink control channel (PUCCH) resource used by the UE to send the ACK/NACK feedback is indicated to the UE by the gNB through the PDCCH.

If the UE receives the PDSCH at time slot n, the UE sends the ACK/NACK feedback on the PUCCH at time slot n+k$_1$, where k1 is indicated via the PDCCH.

In the NR, the dynamically scheduled PUSCH transmission of the UE and the resource allocation information received in response to the ACK/NACK feedback of the PDSCH are notified to the UE through the downlink scheduling signaling PDCCH or the downlink shared channel transmission RAR. Since the TA mechanism is used in NR, the uplink clock and downlink clock on the UE side are not aligned, and the advance of the uplink clock with respect to the downlink clock is TA, thus the time slot offset k2 or k1 indicated in the PDCCH or RAR for uplink transmission must be greater than the TA of the UE, so as to ensure that the UE can perform uplink transmission after receiving the PDCCH or PDSCH. Based on the current standard, the maximum value of k2 can be taken as 32 time slots and the maximum value of k1 can be taken as 15 time slots.

In the traditional NR land cellular network, the cell coverage is small and the signal transmission delay between UE and network device is small, so the TA value of UE is also small, which is less than the maximum value of k2 and k1 currently supported.

The signal propagation delay between the UE and the satellite in NTN is significantly increased compared to the cellular network used in conventional NR. The maximum signal transmission round trip time between UE and network device is 25.77 ms for LEO scenario and 541.46 ms for GEO scenario, which means that the TA of UE in NTN is 541.46 ms. This TA value is much larger than the maximum values of k2 and k1 that can be supported in the current standard.

To address these issues, the radio access network (RAN)1 has agreed to introduce a k offset for k2 and k1 that is configured to compensate for the great TA used by UE in the NTN. No conclusion has been reached on how to determine the k offset.

The technical solutions of embodiments of the present disclosure may be applied to various communication systems, such as: global system of mobile communication (GSM) system, code division multiple access (CDMA) system, wideband code division multiple access (WCDMA) system, general packet radio service (GPRS) system, long term evolution (LTE) system, advanced long term evolution (LTE-A) system, new radio (NR) system, evolution system for NR system. LTE-based access to unlicensed spectrum (LTE-U) system, NR-based access to unlicensed spectrum (NR-U) system, non-terrestrial network (NTN) system, universal mobile telecommunication system (UMTS), wireless local area network (WLAN) system, wireless fidelity (Wi-Fi), 5th-generation (5G) system, or other communication systems.

Generally speaking, conventional communication systems support a limited number of connections and are easy to implement. However, with the development of communication technology, mobile communication systems will support not only conventional communication, but also, for example, device-to-device (D2D) communication, machine-to-machine (M2M) communication, machine-type communication (MTC), vehicle to vehicle (V2V) communication, or vehicle to everything (V2X) communication, etc., to which the embodiments of the present disclosure may also be applied.

In some embodiments, the communication system in the present disclosure may be applied to carrier aggregation (CA) scenarios, to dual connectivity (DC) scenarios, and to standalone (SA) deployment scenarios.

In some embodiments, the communication system in the present disclosure may be applied to non-licensed spectrum, where the non-licensed spectrum may also be considered shared spectrum; or, the communication system in the present disclosure may also applied to licensed spectrum, where the licensed spectrum may also be considered non-shared spectrum.

The present disclosure describes individual embodiments in conjunction with network device and terminal device, where the terminal device may also be referred to as user equipment (UE), access terminal, user unit, user station, mobile station, mobile platform, remote station, remote terminal, mobile device, user terminal, terminal, wireless communication device, user agent, or user device, etc.

The terminal device may be a station (STAION, ST) in WLAN, a cellular phone, a cordless phone, a session initiation protocol (SIP) phone, a wireless local loop (WLL) station, a personal digital assistant (PDA) device, a handheld device with wireless communication capabilities, a computing device or other processing device connected to a wireless modem, an in-vehicle device, a wearable device, terminal devices in a next-generation communication system such as NR network, or terminal devices in a future evolved common land mobile network (PLMN) network, etc.

In the present embodiments, the terminal device may be deployed on land, including indoors or outdoors, handheld, wearable, or vehicle-mounted; on water (e.g., ships, etc.); and in the air (e.g., on aircraft, balloons, satellites, etc.).

In the present embodiments, the terminal device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, etc.

By way of example and not limitation, in the present embodiments, the terminal device may be a wearable device. The wearable device may also be called a wearable smart device, which is a general term for a device that can be worn by applying wearable technology to intelligently design and develop everyday wear, such as glasses, gloves, watches, apparel, and shoes, etc. The wearable device is a portable device that is worn directly on the body or integrated into the user's clothing or accessories. The wearable device is not only a hardware device, but also a powerful function through software support as well as data interaction and cloud interaction. Broadly speaking, the wearable smart device includes full-featured and large-sized devices that can achieve complete or partial functions without relying on smartphones, such as smart watches or smart glasses, and devices that only focus on a certain type of application and need to be used in conjunction with other devices such as smartphones, such as smart bracelets and smart jewelry for physical signs monitoring.

In the present embodiments, the network device may be a device for communicating with a mobile device, the network device may be an access point (AP) in WLAN, a base transceiver station (BTS) in GSM or CDMA, a base station (NodeB, NB) in WCDMA, an evolutional base station (evolutional node B, eNB or eNodeB) in LTE, or a relay station or access point, or an in-vehicle device, a wearable device, and network devices (gNB) in an NR network or in a future evolved PLMN network or in an NTN network, etc.

By way of example and not limitation, in the present embodiments, the network device may have mobile characteristics, for example, the network device may be a mobile device. In some embodiments, the network device may be a satellite, a balloon station. For example, the satellite may be a low earth orbit (LEO) satellite, medium earth orbit (MEO) satellite, geostationary earth orbit (GEO) satellite, high elliptical orbit (HEO) satellite, etc. In some embodiments, the network device may be a base station set up on land, water, etc.

In the present embodiments, the network device may provide service to the cell, and the terminal device communicates with the network device through transmission resources (e.g., frequency domain resources, or spectrum resources) used by the cell. The cell may be a cell corresponding to the network device (e.g., base station). The cell may belong to a macro base station or a base station corresponding to a small cell, where the small cell may include: Metro Cell, Micro cell, Pico cell, Femto cell, etc. The small cells have the characteristics of small coverage area and low transmit power, which are suitable for providing high speed data transmission services.

Figure 2:
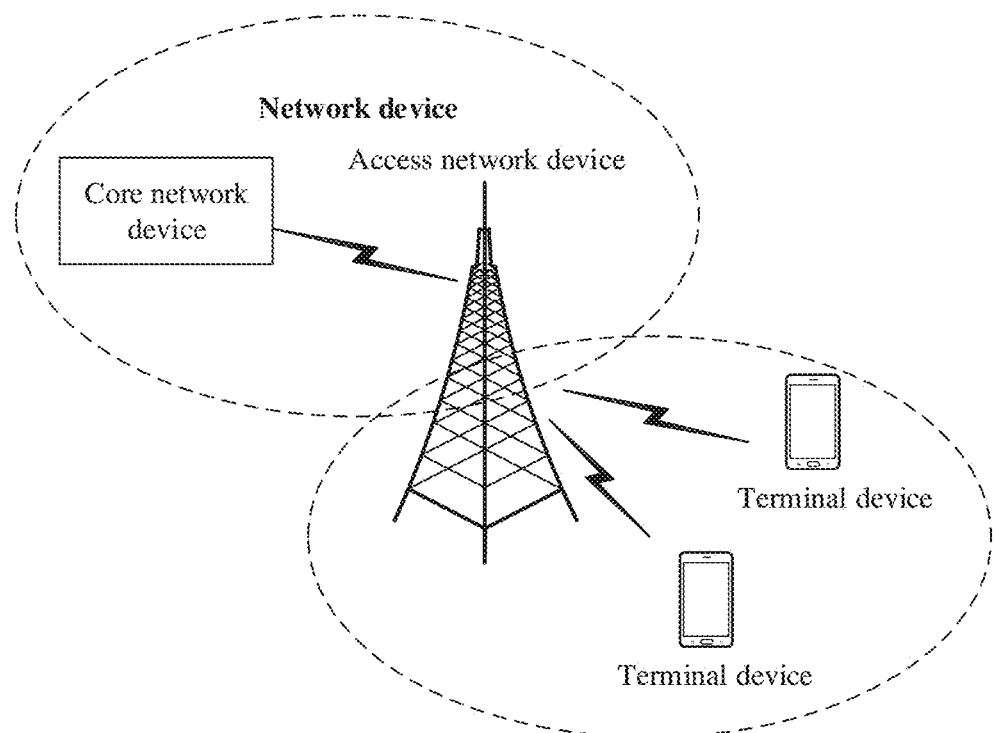
FIG. 2 is a system architecture view of a communication system applied in an embodiment of the present disclosure.

Referring to FIG. 2, FIG. 2 is a system architecture view of a communication system applied in an embodiment of the present disclosure. The communication system may include a network device, and the network device may be a device that communicates with a terminal device (or referred to as a communication terminal, terminal). The network device may provide communication coverage for a specific geographic area and may communicate with terminal devices located within the coverage area. FIG. 2 illustrates exemplarily a network device and two terminal devices. In some embodiments, the communication system may include multiple network devices, and other numbers of terminal devices may be included within the coverage area of each network device, without limitation in the present embodiments. In some embodiments, the communication system may further include other network entities such as network controllers, mobile management entities, etc., which are not limited by the present disclosure.

The network device may further include an access network device and a core network device. That is, the wireless communication system further includes multiple core networks for communication with the access network device. The access network device may be an evolutionary node B (eNB or e-NodeB) macro base station, micro base station (also called a small base station), micro base station, access point (AP), transmission point (TP) or new-generation base station (new generation Node B, gNodeB), etc., in a long-term evolution (LTE) system, a next generation (next radio, NR) (mobile communication) system or authorized auxiliary access long-term evolution (LAA-LTE) system.

It can be understood that the devices having communication functions in the network/system in the present embodiments may be referred to as communication devices. Taking the communication system illustrated in FIG. 2 as an example, the communication devices may include network devices and terminal devices with communication functions, and the network devices and terminal devices may be specific devices described in the embodiments of the present disclosure, which will not be described herein. The communication devices may further include other devices in the communication system, such as network controllers, mobile management entities, and other network entities, which are not limited in the embodiments of the present disclosure.

It is understood that the terms "system" and "network" are often used interchangeably in this document. The term "and/or" in this document is only a description of an association relationship of associated objects, indicating that three relationships may exist. For example, A and/or B may indicate: the existence of A alone, the existence of both A and B, and the existence of B alone. In addition, the character "/" in this document generally indicates that before and after the associated object is an "or" relationship.

It is understood that the "indication" referred to in the embodiments of the present disclosure may be a direct indication, an indirect indication, or an indication of an associative relationship. For example, A indicates B, which may mean that A indicates B directly, such as B obtains an object through A; or A indicates B indirectly, such as A indicates C, and B obtains an object through C; or A and B have an association relationship.

It can be understood that in the present embodiments. "preset" may be achieved by pre-storing corresponding codes, tables, or other means that can be used to indicate relevant information in the device (e.g., including terminal devices and network devices), and the present disclosure is not limited to its specific implementation. For example, the "preset" may refer to being defined in a protocol.

It can be understood that in the present embodiments, the "protocol" may refer to standard protocols in the field of communication, which may include, for example, LTE protocol, NR protocol, and related protocols applied in future communication systems, without limitation in the present disclosure.

It can be understood that in the embodiments of the present disclosure, the serial numbers of the processes do not imply the order of execution, and the order of execution of the processes shall be determined by their function and intrinsic logic, and shall not constitute any limitation to the processes implemented in the embodiments of the present disclosure.

The technical solution of the present disclosure is further described below by way of embodiments, as follows.

Figure 3A:
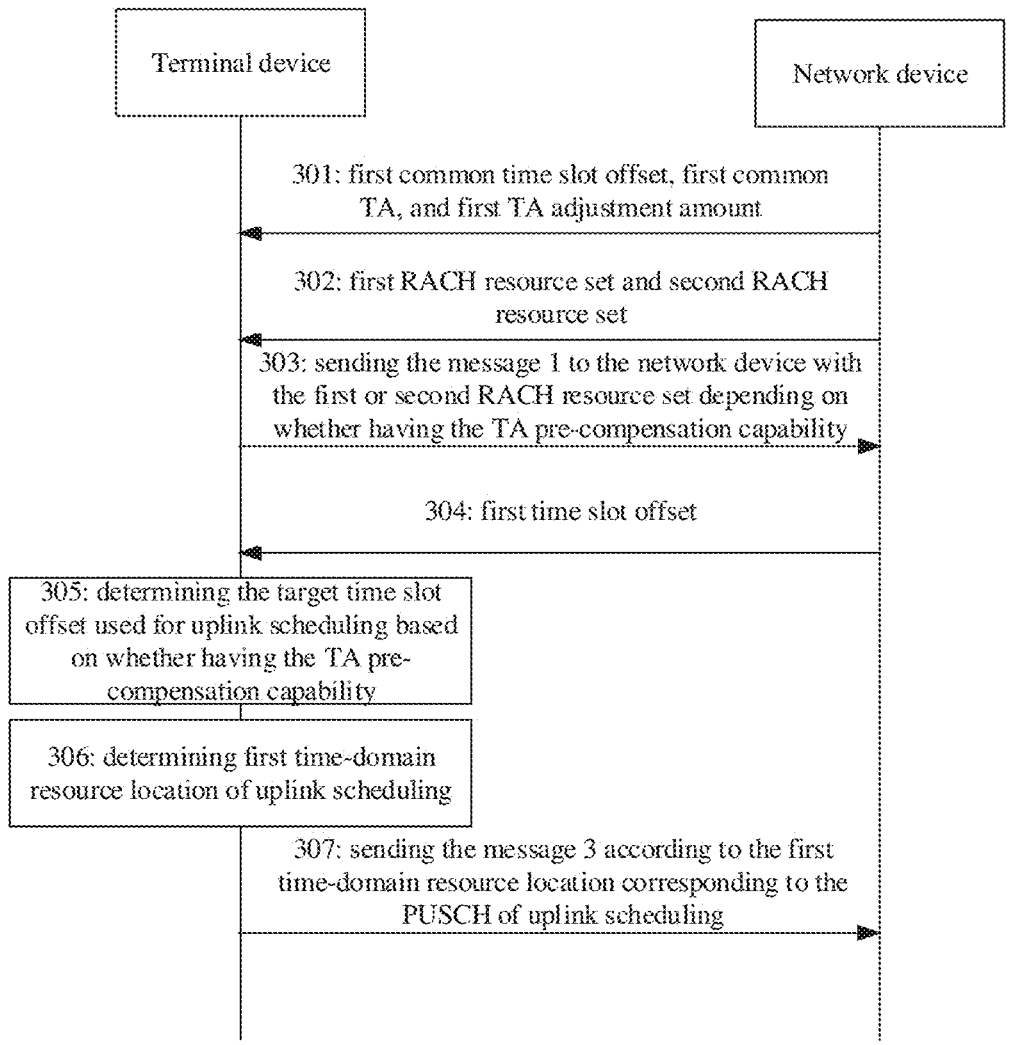
FIG. 3A is a schematic view of a method for determining time-domain resource of uplink transmission according to an embodiment of the present disclosure.

Embodiment I. In a case where the terminal device is applied to a four-step random access, FIG. 3A is a schematic view of a method for determining time-domain resource of uplink transmission according to an embodiment of the present disclosure. The method may include the following operations.

At block 301: receiving, by a terminal device, a first common time slot offset, a first common TA, and a first TA adjustment amount sent by a network device.

The first common time slot offset and the first common TA are configured by the network device. In some embodiments, the first common time slot offset may be a timing advance (TA) value determined by the network device based on a ground reference point 1; the first common TA may be a TA value determined by the network device based on a ground reference point 2; and the first TA adjustment amount is a TA adjustment amount determined by the network device based on a reception of a message 1 (msg1) sent by the terminal device.

It is understood that the network device may broadcast one first common time slot offset (which may also be referred to as a common k2 offset) that is a PUSCH common time slot offset value for msg3 scheduling during the four-step random-access process. The first common time slot offset may be based on a TA value corresponding to a certain ground reference point. For example, it may be based on a ground location farthest from the satellite within the cell coverage area as the ground reference point to determine the common k2 offset. In the four-step random-access process, the terminal device may determine a target time slot offset (which may also be referred to as k2 offset) used by the msg3 time domain resource based on whether it has a TA pre-compensation capability.

In some embodiments, the first common time slot offset and the first common TA are carried in a system message. For example, the system message may be a system information block x (SIB x), where x is greater than or equal to 1.

It is noted that the first common time slot offset and the first common TA may be configured by the network device and distributed to the terminal devices together, or may be distributed to the terminal devices separately, as specified herein without limitation. In some embodiments, the first common time slot offset and the first common TA are configured by the network device to the terminal device via broadcast or multicast. The first TA adjustment amount may be referred to the description of the adjustment of TA in the previous section, which is not repeated herein. In some embodiments, the first TA adjustment amount may be carried in a msg2 (e.g., RAR) sent to the terminal device.

At block 302: receiving, by the terminal device, a first random access channel (RACH) resource set and a second RACH resource set sent by the network device, where the first RACH resource set is configured for the terminal device having a TA pre-compensation capability to send a message 1, and the second RACH resource set is configured for the terminal device not having the TA pre-compensation capability to send the message 1.

It is understood that the first RACH resource set and the second RACH resource set are RACH resources configured by the network device for the terminal device with the TA pre-compensation capability and terminal device without TA pre-compensation capability, respectively. It is to be noted that the timing of steps 301 and 302 is not limited, by which configuration information is sent by the network device for the terminal device to configure the four-step random access related parameters.

At block 303: sending, by the terminal device, the message 1 to the network device with the first RACH resource set or the second RACH resource set depending on whether the terminal device has the TA pre-compensation capability.

In some embodiments, the terminal device sends the message 1 to the network device with the first RACH resource set or the second RACH resource set depending on whether the terminal device has the TA pre-compensation capability, which may include, but is not limited to, the following implementations.

Mode 1: In a case where the terminal device has the TA pre-compensation capability, the terminal device selects a RACH resource from the first RACH resource set and sends the message 1 to the network device.

In some embodiments, in case the terminal device has the TA pre-compensation capability, the terminal device performs TA compensation with the first estimated TA, selects a RACH resource from the first RACH resource set, and sends the message 1 to the network device. That is, for a UE with the TA pre-compensation capability, the UE can use its own first estimate TA estimated based on a global navigation satellite system (GNSS) capability for TA compensation when sending the msg1.

Mode 2: In a case where the terminal device does not have the TA pre-compensation capability, the terminal device selects a RACH resource from the second RACH resource set and sends the message 1 to the network device.

In some embodiments, in case the terminal device does not have the TA pre-compensation capability, the terminal device performs TA compensation with the first common TA, selects a RACH resource from the second RACH resource set, and sends the message 1 to the network device. That is, for a UE without the TA pre-compensation capability, the UE uses the first common TA broadcast by the network device for TA compensation when sending the msg1.

It can be understood that for UE with the TA pre-compensation capability and UE without the TA pre-compensation capability, the network device configures the RACH resources separately. That is, the UE selects a RACH resource from the corresponding RACH resource set to send the msg1 according to whether TA compensation is performed when sending the msg1.

At block 304: receiving, by the terminal device, a first time slot offset sent by the network device; where the first time slot offset is determined by the network device based on a target time slot offset used by the terminal device.

(1) In a case where the terminal device has the TA pre-compensation capability, the first time slot offset is an increment determined by the network device relative to the first common time slot offset.

(2) In a case where the terminal device does not have the TA pre-compensation capability, the first time slot offset is an increment determined by the network device relative to the TA actually used by the terminal device when sending a message 3.

It is understood that the network device, after receiving the msg1 from the terminal device, can know from the RACH resource used by the terminal device to send the msg1 whether the terminal device has the TA pre-compensation capability.

When the terminal device uses its own estimated first estimated TA for TA compensation when sending the msg1, the network device is not informed of the TA value used by the terminal device at this time. For this case, the PUSCH first time slot offset (which may also be called time slot offset k2) of the msg3 indicated by the network device in RAR can only be an increment relative to the first common time slot offset (common k2 offset).

When the terminal device uses the first common TA broadcast by the network device for TA compensation when transmitting the msg1, the network device can be informed of the TA value of the terminal device at this time. For this case, the PUSCH first time slot offset (which may also be referred to as the time slot offset value k2) of the msg3 indicated by the network device in RAR is an increment relative to the actual TA of the UE.

Exemplarily, the UE, after sending the msg1, receives the msg2 from the network device, which may be a RAR. The RAR indicates UL grant information transmitted by the msg3 of the terminal device, including a PUSCH time slot offset value k2 of the msg3. The time slot offset value k2 is configured to determine the time slot offset value of the PUSCH of the msg3 relative to the PDSCH of the RAR, the k2 being a relative time slot offset value.

At block 305: determining, by the terminal device, the target time slot offset used for uplink scheduling based on whether the terminal device has the TA pre-compensation capability.

In some embodiments, the terminal device determines the target time slot offset used for uplink scheduling based on whether the terminal device has the TA pre-compensation capability, which may include, but is not limited to, the following implementations.

Mode 1: In a case where the terminal device has the TA pre-compensation capability, the terminal device determines the first common time slot offset as the target time slot offset used for uplink scheduling. Exemplarily, when the UE has the TA pre-compensation capability (i.e., the UE sends the msg1 using its own estimated first estimated TA, the UE uses the common k2 offset broadcast by the network device as the k2 offset for msg3 scheduling.

Mode 2: In a case where the terminal device does not have the TA pre-compensation capability, the terminal device determines a sum of the first common TA and the first TA adjustment amount as the target time slot offset used for uplink scheduling. When the UE does not have the TA pre-compensation capability (i.e., the UE sends the msg1 using the first common TA broadcast by the network), the UE uses its own TA (i.e., the first common TA+the first TA adjustment amount indicated in the RAR) as the k2 offset for msg3 scheduling.

At block 306: determining, by the terminal device, a first time-domain resource location of uplink scheduling.

In some embodiments, the terminal device determines the first time-domain resource location of uplink scheduling, which may include, but is not limited to, the following implementations.

Mode 1: In a case where the terminal device has the TA pre-compensation capability, the terminal device determines the first time-domain resource location of uplink scheduling based on a first time slot number, the first time slot offset, the first common time slot offset and $\Delta_1$, where the first time slot number is a downlink time slot number corresponding to the PDSCH of the terminal device receiving the message 2; the value of $\Delta_1$ is taken with respect to an uplink subcarrier interval.

In some embodiments, the terminal device determines a sum of the first time slot number, the first time slot offset, the first common time slot offset, and $\Delta_1$ as the first time-domain resource location corresponding to the PUSCH of uplink scheduling.

Exemplarily, the UE determines the PUSCH timeslot number of the msg3 as n1+k2+common k2 offset+$\Delta_1$, where n1 is the downlink timeslot number corresponding to the PDSCH of the UE receiving the RAR, k2+common k2 offset+$\Delta_1$ is the timeslot offset of the PUSCH transmission by the msg3 with respect to the PDSCH reception by the RAR, and the value of $\Delta_1$ is taken with respect to the uplink subcarrier interval.

Mode 2: in a case where the terminal device does not have the TA pre-compensation capability, the terminal device determines the first time-domain resource location of uplink scheduling based on the first time slot number, the first time slot offset, the first common TA, the first TA adjustment amount, and $\Delta_1$, where the first time slot number is the downlink time slot number corresponding to the PDSCH of the terminal device receiving the message 2; the value of $\Delta_1$ is taken with respect to the uplink subcarrier interval.

In some embodiments, the terminal device determines a sum of the first time slot number, the first time slot offset, the first common TA, the first TA adjustment amount, and $\Delta_1$ as the first time-domain resource location corresponding to the PUSCH of uplink scheduling.

Exemplarily, the UE determines the PUSCH timeslot number of the msg3 as n1+k2+TA+$\Delta_1$, where n1 is the downlink timeslot number corresponding to the PDSCH of the UE receiving the RAR, k2+TA+$\Delta_1$ is the timeslot offset of the PUSCH transmitted by the msg3 with respect to the PDSCH received by the RAR, and the value of $\Delta_1$ is taken with respect to the uplink subcarrier interval. The TA is a sum of the first common TA and the first TA adjustment amount.

At block 307: sending, by the terminal device, the message 3 according to the first time-domain resource location corresponding to the PUSCH of uplink scheduling.

The network device receives the message 3 sent by the terminal device at the first time-domain resource location of uplink scheduling; the first time-domain resource location of uplink scheduling is the first time-domain resource location corresponding to the PUSCH of uplink scheduling.

Figure 3B:
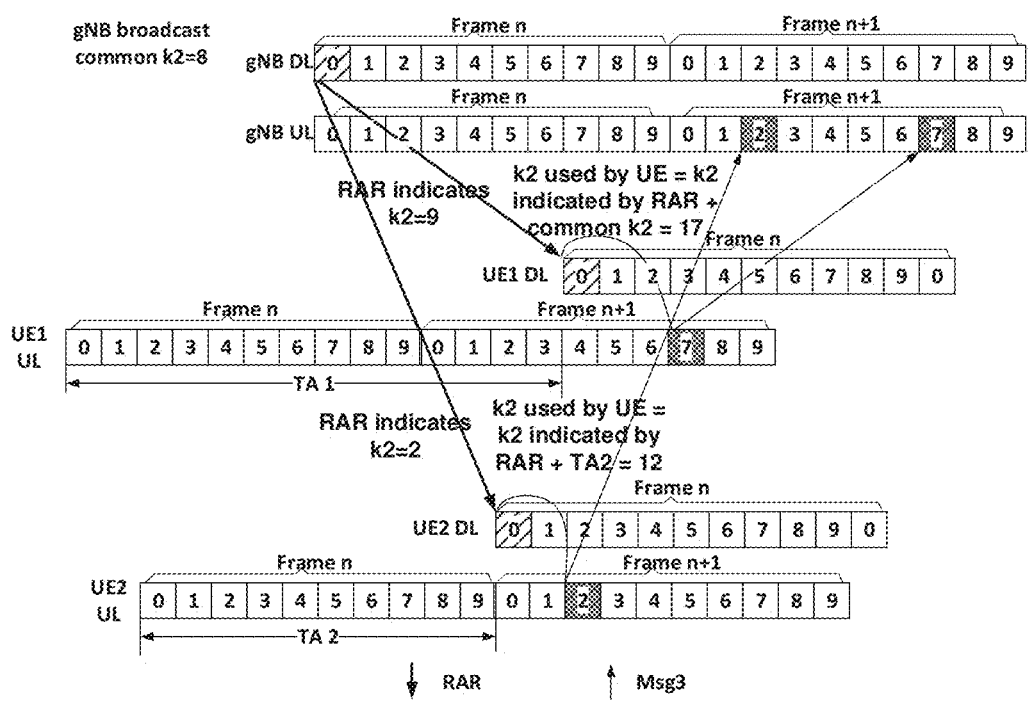
FIG. 3B is a schematic view of a method for determining time-domain resource of uplink transmission according to another embodiment of the present disclosure.

Exemplarily, referring to FIG. 3B, FIG. 3B is a schematic view of a method for determining time-domain resource of uplink transmission according to another embodiment of the present disclosure. In the illustration shown in FIG. 3B, it is assumed that UE1 is a UE with the TA pre-compensation capability and UE2 is a UE without the TA pre-compensation capability.

In the embodiments of the present disclosure, the network device broadcasts one common k2 offset, the common k2 offset being a PUSCH common time slot offset for msg3 scheduling during the four-step random-access process. During the four-step random-access process, the UE determines the k2 offset used for determining the msg3 time domain resources based on whether the UE has the TA pre-compensation capability. That is, the embodiments of the present disclosure propose a method for determining the relative time slot offset value (k offset) of uplink transmission resources relative to downlink reception by the terminal device in an NTN. By virtue of this method, it is possible to avoid adding more signaling overhead and achieve accurate control of the time slot offset of uplink transmission.

Figure 4:
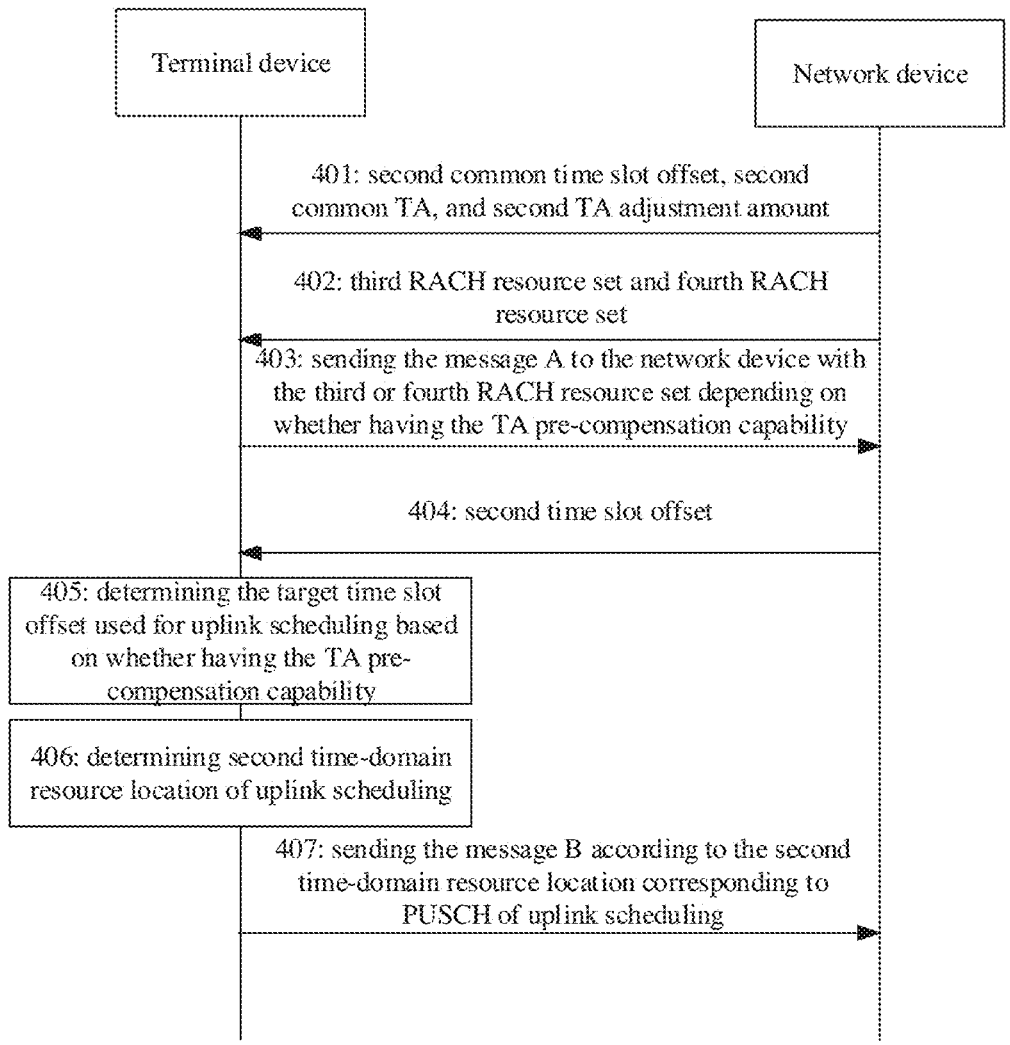
FIG. 4 is a schematic view of a method for determining time-domain resource of uplink transmission according to further another embodiment of the present disclosure.

Embodiment II. In a case where the terminal device is applied to a two-step random access, FIG. 4 is a schematic view of a method for determining time-domain resource of uplink transmission according to further another embodiment of the present disclosure. The method may include the following operations.

At block 401: receiving, by a terminal device, a second common time slot offset, a second common TA, and a second TA adjustment amount sent by a network device.

The second common time slot offset and the second common TA are configured by the network device. In some embodiments, the second common time slot offset may be a timing advance (TA) value determined by the network device based on a ground reference point 3; the second common TA may be a TA value determined by the network device based on a ground reference point 4; and the second TA adjustment amount may be a TA adjustment amount determined by the network device based on a reception of a message A sent by the terminal device.

It is understood that the network device may broadcast one second common time slot offset (which may also be referred to as a common k2 offset) that is a PUSCH common time slot offset value indicated by a message B (msgB) for the two-step random-access process. The second common time slot offset may be based on a TA value corresponding to a certain ground reference point. For example, it may be based on a ground location farthest from the satellite within the cell coverage area as the ground reference point to determine the common k2 offset. In the two-step random access process, the terminal device may determine a target time slot offset (which may also be referred to as k2 offset) used by the PUSCH time domain resource indicated by the msgB based on whether it has a TA pre-compensation capability, and for the terminal device with the TA pre-compensation capability, whether it has performed TA upload via the msgA.

In some embodiments, the second common time slot offset and the second common TA are carried in a system message. For example, the system message may be a system information block x (SIB x), where x is greater than or equal to 1.

It is noted that the second common time slot offset and the second common TA may be configured by the network device and distributed to the terminal devices together, or may be distributed to the terminal devices separately, as specified herein without limitation. In some embodiments, the second common time slot offset and the second common TA are configured by the network device to the terminal device via broadcast or multicast. The second TA adjustment amount may be referred to the description of the adjustment of TA in the previous section, which is not repeated herein. In some embodiments, the second TA adjustment amount may be carried in the msgB sent to the terminal device.

At block 402: receiving, by the terminal device, a third random access channel (RACH) resource set and a fourth RACH resource set sent by the network device, where the third RACH resource set is configured for the terminal device having a TA pre-compensation capability to send a message A, and the fourth RACH resource set is configured for the terminal device not having the TA pre-compensation capability to send the message A.

It is understood that the third RACH resource set and the fourth RACH resource set are RACH resources configured by the network device for the terminal device with the TA pre-compensation capability and terminal device without TA pre-compensation capability, respectively. It is to be noted that the timing of steps 401 and 402 is not limited, by which the configuration information is sent by the network device for the terminal device to configure the two-step random access related parameters.

At block 403: sending, by the terminal device, the message A to the network device with the third RACH resource set or the fourth RACH resource set depending on whether the terminal device has the TA pre-compensation capability.

In some embodiments, the terminal device sends the message A to the network device with the third RACH resource set or the fourth RACH resource set depending on whether the terminal device has the TA pre-compensation capability, which may include, but is not limited to, the following implementations.

Mode 1: In a case where the terminal device has the TA pre-compensation capability, the terminal device performs TA compensation with a second estimated TA, selects a RACH resource from the third RACH resource set, and sends the message A to the network device, the message A carrying the second estimated TA. Exemplarily, for a UE with the TA pre-compensation capability, the UE uses its own second estimated TA based on a GNSS capability estimation for TA compensation when sending the MsgA and performs TA upload through the msgA.

Mode 2: In a case where the terminal device has the TA pre-compensation capability, the terminal device performs TA compensation with a second estimated TA, selects a RACH resource from the third RACH resource set, and sends the message A to the network device, the message A not carrying the second estimated TA. Exemplarily, for a UE with the TA pre-compensation capability, the UE uses its own second estimated TA based on a GNSS capability estimation for TA compensation when sending the MsgA and not performs TA upload through the msgA.

Mode 3: In a case where the terminal device does not have the TA pre-compensation capability, the terminal device performs TA compensation with the second common TA, select a RACH resource from the fourth RACH resource set, and sends the message A to the network device. Exemplarily, for a UE without the TA pre-compensation capability, the UE uses the second common TA broadcast by the network device for TA compensation when sending the msgA.

It can be understood that for UE with the TA pre-compensation capability and UE without the TA pre-compensation capability, the network device configures the 2-step RACH resources separately. That is, the UE selects a RACH resource from the corresponding RACH resource set to send the msgA according to whether TA compensation is performed when sending the msgA.

At block 404: receiving, by the terminal device, a second time slot offset sent by the network device; where the second time slot offset is determined by the network device based on a target time slot offset used by the terminal device.

(1) In a case where the terminal device has the TA pre-compensation capability and where the second estimated TA is uploaded in the message A, the second time slot offset is an increment determined by the network device relative to the TA actually used by the terminal device when sending the uplink transmission scheduled by the message B.

(2) In a case where the terminal device has the TA pre-compensation capability and the second estimated TA is not uploaded in the message A, the second time slot offset is an increment determined by the network device relative to the second common time slot offset.

(3) In a case where the terminal device does not have the TA pre-compensation capability, the second time slot offset is an increment determined by the network device relative to the TA actually used by the terminal device when sending the uplink transmission scheduled by the message B.

It is understood that the network device, after receiving the msgA from the terminal device, can know from the RACH resource used by the terminal device to send the msgA whether the UE in has the TA pre-compensation capability.

When the terminal device uses its own estimated second estimated TA for TA compensation when sending the msgA, and the UE performs TA upload through the msgA, the network device can then be informed of the TA value of the UE. For this case, the PUSCH second time slot offset (also called time slot offset value k2) indicated by the network device in the msgB is an increment relative to the actual TA of the UE.

When the terminal device uses its own estimated second estimated TA for TA compensation when sending the msgA, and the UE does not upload TA through the msgA, the network device is not informed of the TA value used by the UE. For this case, the PUSCH second time slot offset (also called time slot offset value k2) indicated by the network device in the msgB can only be an increment relative to the common k2 offset.

When the terminal device uses the second common TA broadcast by the network device for TA compensation when sending the msgA, the network device is informed of the TA value of the UE. For this case, the PUSCH second time slot offset (also referred to as the time slot offset value k2) indicated by the network device in the msgB is an increment relative to the actual TA of the UE.

Exemplarily, the UE, after sending the msgA, receives the msgB from the network device. The UL grant information in the msgB includes a PUSCH time slot offset value k2 of the UE. The time slot offset value k2 is configured to determine the time slot offset value of the PUSCH relative to the PDSCH of the msgB, the k2 being a relative time slot offset value.

At block 405: determining, by the terminal device, the target time slot offset used for uplink scheduling based on whether the terminal device has the TA pre-compensation capability.

In some embodiments, the terminal device determines the target time slot offset used for uplink scheduling based on whether the terminal device has the TA pre-compensation capability, which may include, but is not limited to, the following implementations.

Mode 1: In a case where the terminal device has the TA pre-compensation capability and the second estimated TA is uploaded in the message A, the terminal device determines a sum of the second estimated TA and the second TA adjustment amount as the target time slot offset used for uplink scheduling. Exemplarily, when the UE has the TA pre-compensation capability (i.e., the UE sends the msgA using its own estimated second estimated TA) and the UE has performed TA upload through the msgA, the UE uses its own TA (i.e., the second estimated TA used by the UE when sending the msgA+the second TA adjustment amount indicated in the msgB) as the k2 offset for the PUSCH scheduling indicated in the msgB.

Mode 2: In a case where the terminal device has the TA pre-compensation capability and the second estimated TA is not uploaded in the message A, the terminal device determines the second common time slot offset as the target time slot offset used for uplink scheduling. Exemplarily, when the UE has the TA pre-compensation capability (i.e., the UE sends the msgA using its own estimated second estimated TA) and the UE does not perform TA upload through the msgA, the UE uses the common k2 offset broadcast by the network device as the k2 offset for the PUSCH scheduling indicated in the msgB.

Mode 3: in a case where the terminal device does not have the TA pre-compensation capability, the terminal device determines the sum of the second common TA and the second TA adjustment amount as the target time slot offset used for uplink scheduling. Exemplarily, when the UE does not have the TA pre-compensation capability (i.e., the UE sends the msgA using the second common TA broadcast by the network device), the UE uses its own TA (i.e., the second common TA+the second TA adjustment amount indicated in the msgB) as the k2 offset for the PUSCH scheduling indicated in the msgB.

At block 406: determining, by the terminal device, a second time-domain resource location of uplink scheduling.

In some embodiments, the terminal device determines the second time-domain resource location of uplink scheduling, which may include, but is not limited to, the following implementations.

Mode 1: In a case where the terminal device has the TA pre-compensation capability and the second estimated TA is uploaded in the message A, the terminal device determines the second time-domain resource location of uplink scheduling based on the second time slot number, the second time slot offset, the second estimated TA, the second TA adjustment amount, and $\Delta_2$; where the second time slot number is a downlink time slot number corresponding to the PDSCH of the terminal device receiving the message B; the value of $\Delta_2$ is taken with respect to an uplink subcarrier interval.

In some embodiments, the terminal device determines a sum of the second time slot number, the second time slot offset, the second estimated TA, the second TA adjustment amount, and $\Delta_2$ as the second time-domain resource location corresponding to the PUSCH of uplink scheduling.

Exemplarily, the UE determines the PUSCH timeslot number of the message B as n2+k2+TA+$\Delta_2$, where n2 is the downlink timeslot number corresponding to the PDSCH of the UE receiving the msgB, k2+TA+$\Delta_2$ is the timeslot offset of the PUSCH transmission of the msg3 relative to the PDSCH reception of the message B, and $\Delta_2$ is taken with respect to the uplink subcarrier interval. The TA is a sum of the second estimated TA and the second TA adjustment amount.

Mode 2: in a case where the terminal device has the TA pre-compensation capability and the second estimated TA is not uploaded in the message A, the terminal device determines the second time-domain resource location of uplink scheduling based on the second time slot number, the second time slot offset, the second common time slot offset, and $\Delta_2$; where the second time slot number is the downlink time slot number corresponding to the PDSCH of the terminal device receiving the message B; the value of $\Delta_2$ is taken with respect to the uplink subcarrier interval.

In some embodiments, the terminal device determines a sum of the second time slot number, the second time slot offset, the second common time slot offset, and $\Delta_2$ as the second time-domain resource location corresponding to the PUSCH of uplink scheduling.

The UE determines the PUSCH timeslot number as n2+k2+common k2 offset+$\Delta_2$, where n2 is the downlink timeslot number corresponding to the PDSCH of the UE receiving the msgB, k2+common k2 offset+$\Delta_2$ is the timeslot offset of the PUSCH transmission of the msg3 relative to the PDSCH reception of message B, and the value of $\Delta_2$ is taken with respect to the uplink subcarrier interval.

Mode 3: in a case where the terminal device does not have the TA pre-compensation capability, the terminal device determines the second time-domain resource location of uplink scheduling based on the second time slot number, the second time slot offset, the second common TA, the second TA adjustment amount, and $\Delta_2$; where the second time slot number is the downlink time slot number corresponding to the PDSCH of the terminal device receiving message B; the value of $\Delta_2$ is taken with respect to the uplink subcarrier interval.

In some embodiments, the terminal device determines a sum of the second time slot number, the second time slot offset, the second common TA, the second TA adjustment amount, and $\Delta_2$ as the second time-domain resource location corresponding to the PUSCH of uplink scheduling.

Exemplarily, the UE determines the PUSCH timeslot number as n2+k2+TA+$\Delta_2$, where n2 is a downlink timeslot number corresponding to the PDSCH of the UE receiving the msgB, k2+TA+$\Delta_2$ is the timeslot offset of the PUSCH transmission by the msg3 relative to the PDSCH reception by the msgB, and the value of $\Delta_2$ is taken with respect to the uplink subcarrier interval. The TA is a sum of the second common TA and the second TA adjustment amount.

At block 407: sending, by the terminal device, the message B according to the second time-domain resource location corresponding to the PUSCH of uplink scheduling.

The network device receives the message B sent by the terminal device at the second time-domain resource location of uplink scheduling; the second time-domain resource location of uplink scheduling is the second time-domain resource location corresponding to the PUSCH of uplink scheduling.

In the embodiments of the present disclosure, the two-step random-access process, the UE determines the k2 offset used by the PUSCH time domain resource indicated by the msgB based on whether it has the TA pre-compensation capability, and for UE with the TA pre-compensation capability, whether it has performed TA upload through the msgA. That is, the embodiments of the present disclosure propose a method for determining the relative time slot offset value (k offset) of uplink transmission resources relative to downlink reception by the terminal device in an NTN. By virtue of this method, it is possible to avoid adding more signaling overhead and achieve accurate control of the time slot offset of uplink transmission.

Figure 5A:
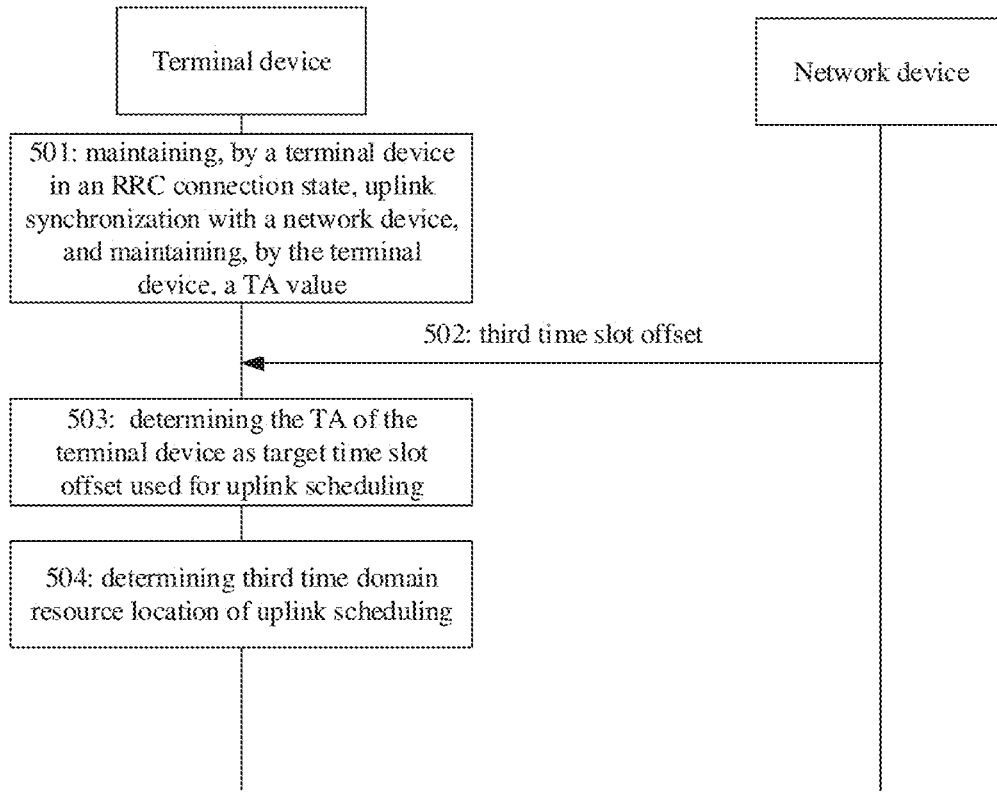
FIG. 5A is a schematic view of a method for determining time-domain resource of uplink transmission according to further another embodiment of the present disclosure.

Embodiment III. In a case where the PDCCH indicates a PUSCH time slot offset value k2 of uplink scheduling. FIG. 5A is a schematic view of a method for determining time-domain resource of uplink transmission according to further another embodiment of the present disclosure. The method may include the following operations.

At block 501: maintaining, by a terminal device in an RRC connection state, uplink synchronization with a network device, and maintaining, by the terminal device, a TA value.

At block 502: receiving, by the terminal device, a third time slot offset sent by the network device, where the third time slot offset is an increment determined by the network device relative to the TA of the terminal device.

Exemplarily, the UE receives a PDCCH indicating uplink scheduling, the PDCCH indicating time-frequency resources used for the PUSCH transmission and adjusting a coding method and other information.

For the PUSCH time domain resource allocation information, it may specifically include: a PUSCH time slot offset value k2, the time slot offset value k2 being configured to determine a relative time slot offset of the PUSCH with respect to the PDCCH. The relative time slot offset means that the k2 as indicated by the network device is an increment relative to the current TA of the UE.

At block 503: determining, by the terminal device, the TA of the terminal device as a target time slot offset used for uplink scheduling.

In some embodiments, with the terminal device in a connected state, the target time slot offset is an offset used by the uplink scheduling PUSCH time domain resources.

Exemplarily, for uplink dynamic scheduling, the UE uses its own TA as the target time slot offset (which may also be referred to as k2 offset) used by the PUSCH time domain resource indicated by the PDCCH.

At block 504: determining, by the terminal device, a third time domain resource location of uplink scheduling.

In some embodiments, the terminal device determines a third time-domain resource location of uplink scheduling, which may include the following implementation.

(a) The terminal device determines the third time-domain resource location of uplink scheduling according to $$\left\lfloor n_3 \cdot \frac{2^{\mu_{PUSCH}}}{2^{\mu_{PDCCH}}} \right\rfloor + k_2 + TA.$$

The third time slot number $n_3$ is a downlink time slot number corresponding to the PDCCH received by the terminal device indicating the uplink scheduling, $k_2$ is the third time slot offset, i.e., the relative time slot offset of the PUSCH indicated in the PDCCH relative to the PDCCH, $\mu_{PUSCH}$ and $\mu_{PDCCH}$ are the subcarrier interval configurations of the PUSCH and the PDCCH, respectively, and k2+TA is the time slot offset of the PUSCH transmission relative to the PDCCH reception.

Figure 5B:
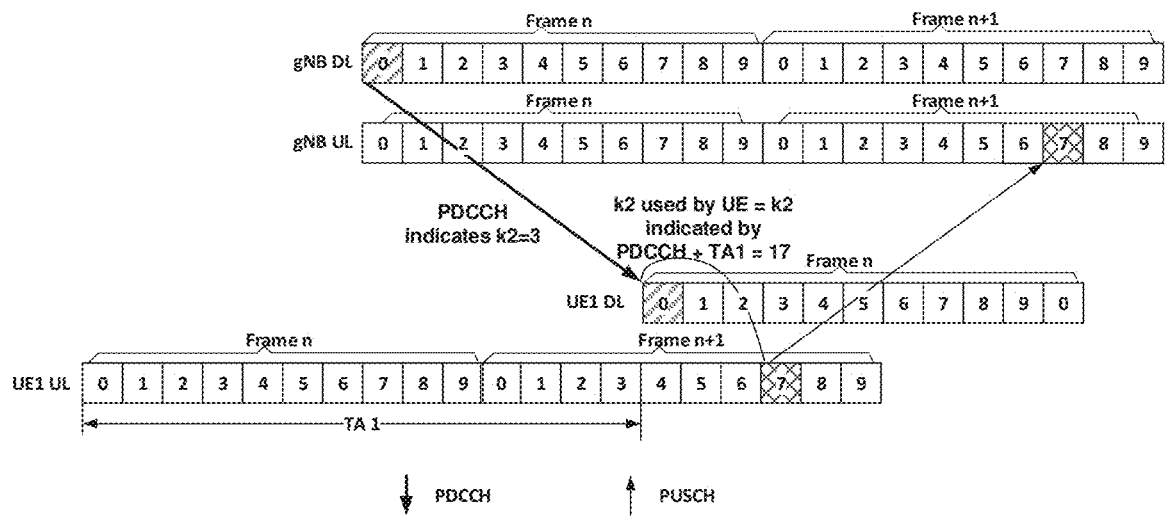
FIG. 5B is a schematic view of a method for determining time-domain resource of uplink transmission according to further another embodiment of the present disclosure.

Exemplarily, FIG. 5B is a schematic view of a method for determining time-domain resource of uplink transmission according to further another embodiment of the present disclosure.

In the embodiments of the present disclosure, for uplink dynamic scheduling, the UE uses its own TA as the k2 offset used for the PUSCH time domain resource indicated by the PDCCH. That is, the embodiments of the present disclosure propose a method for determining the relative time slot offset value (k offset) of uplink transmission resources relative to downlink reception by the terminal device in an NTN. By virtue of this method, it is possible to avoid adding more signaling overhead and achieve accurate control of the time slot offset of uplink transmission.

Figure 6A:
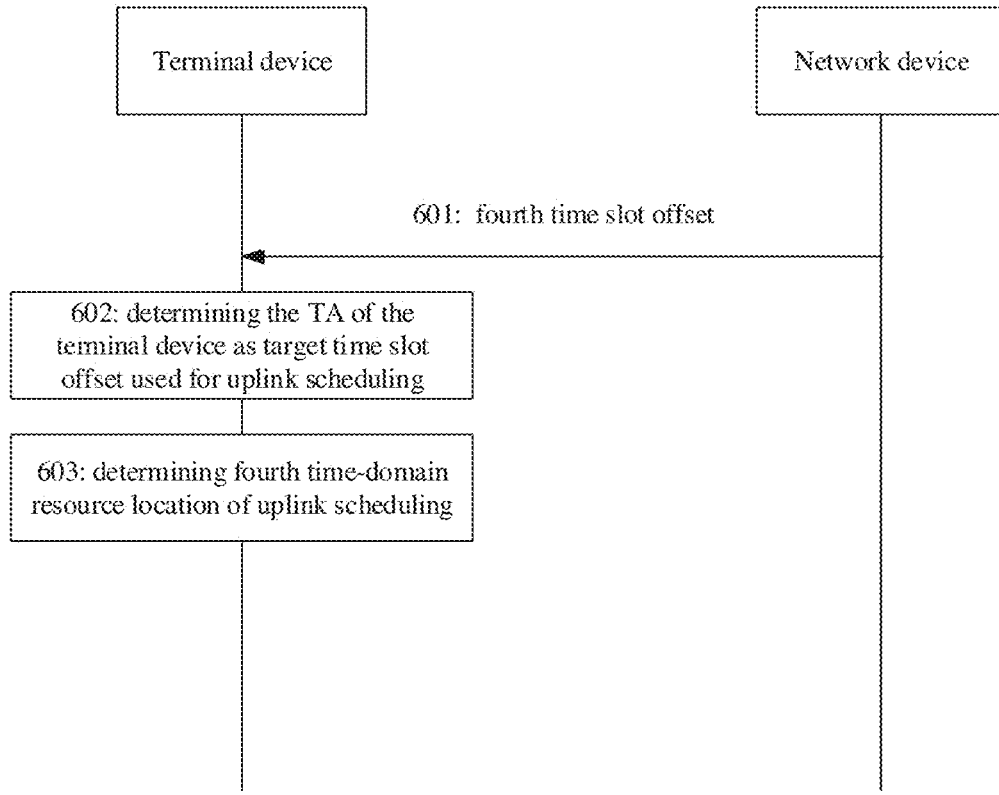
FIG. 6A is a schematic view of a method for determining time-domain resource of uplink transmission according to further another embodiment of the present disclosure.

Embodiment IV. In a case where the PDCCH indicates a PUCCH time slot offset value k of an ACK/NACK feedback of the PDSCH. FIG. 6A is a schematic view of a method for determining time-domain resource of uplink transmission according to further another embodiment of the present disclosure. The method may include the following operations.

At block 601: receiving, by a terminal device, a fourth time slot offset sent by a network device, where the fourth time slot offset is an increment of a TA, determined by the network device, relative to the terminal device.

Exemplarily, the UE receives a PDCCH indicating downlink scheduling, the PDCCH indicating time-frequency resources used for the PDSCH transmission and adjusting a coding method and other information, while the PDCCH also indicates the PUCCH time domain resource information received by the UE in response to the ACK/NACK received by the PDSCH.

For the PUCCH time domain resource allocation information for ACK/NACK feedback, it may specifically include: a PUCCH time slot offset value k1, the time slot offset value k1 being configured to determine a relative time slot offset of the PUCCH with respect to the PDSCH. The relative time slot offset value means that k1 as indicated by the network device is an increment relative to the current TA of the UE.

At block 602: determining, by the terminal device, the TA of the terminal device as a target time slot offset used for uplink scheduling.

In some embodiments, the target time slot offset is an offset used by the PUCCH for the ACK/NACK feedback.

Exemplarily, the UE uses its own TA as the target time slot offset (which may also be referred to as k1 offset) corresponding to the PUCCH for the ACK/NACK feedback indicated by the PDCCH.

At block 603: determining, by the terminal device, a fourth time-domain resource location of uplink scheduling.

In some embodiments, the terminal device determines a fourth time-domain resource location of uplink scheduling, which may include the following implementation.

The terminal device determines the fourth time-domain resource location corresponding to the PUCCH for the ACK/NACK feedback based on a sum of the fourth time slot number, the fourth time slot offset, and the TA. The fourth time slot number is a downlink time slot number corresponding to the PDSCH received by the terminal device.

Exemplarily, the UE uses its own TA as the k1 offset corresponding to the PUCCH indicated by the PDCCH for the ACK/NACK feedback, then the UE determines the PUCCH timeslot number for the ACK/NACK feedback as n4+k1+TA, where k1 is the fourth timeslot offset, n4 is the downlink timeslot number corresponding to the PDSCH received by the UE, and k1+TA is the time slot offset of the PUCCH transmission relative to the PDSCH reception.

Figure 6B:
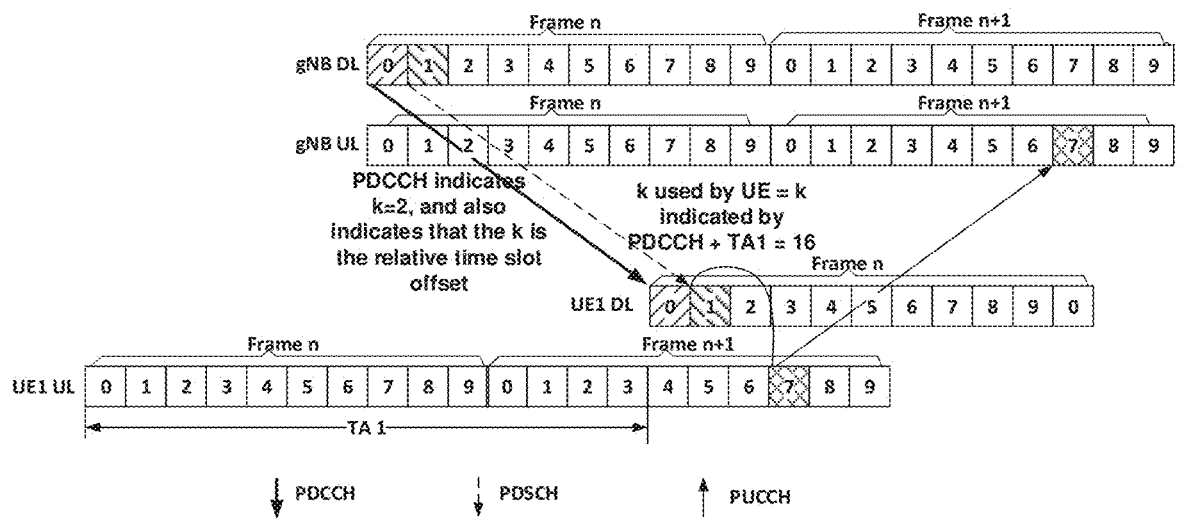
FIG. 6B is a schematic view of a method for determining time-domain resource of uplink transmission according to further another embodiment of the present disclosure.

Exemplarily. FIG. 6B is a schematic view of a method for determining time-domain resource of uplink transmission according to further another embodiment of the present disclosure.

In the embodiments of the present disclosure, for PDSCH transmissions, the UE uses its own TA as the k1 offset used for the PUCCH time domain resources indicated by the PDCCH for ACK/NACK feedback. That is, the embodiments of the present disclosure propose a method for determining the relative time slot offset value (k offset) of uplink transmission resources relative to downlink reception by the terminal device in an NTN. By virtue of this method, it is possible to avoid adding more signaling overhead and achieve accurate control of the time slot offset of uplink transmission.

Figure 7:
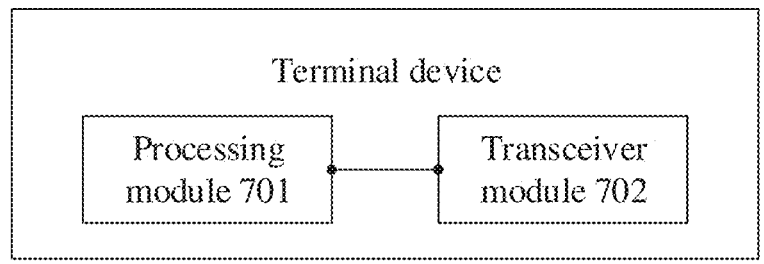
FIG. 7 is a schematic view of a terminal device according to an embodiment of the present disclosure.

Referring to FIG. 7, FIG. 7 is a schematic view of a terminal device according to an embodiment of the present disclosure. The terminal device may include the following elements.

A processing module 701 and a transceiver module 702.

In some embodiments, the processing module 701 is configured to determine a target time slot offset used for uplink scheduling based on whether the terminal device has a TA pre-compensation capability.

In some embodiments, in a case where the terminal device is applied to a four-step random access, the transceiver module 702 is configured to receive a first common time slot offset, a first common TA, and a first TA adjustment amount sent by a network device. The first TA adjustment amount is a TA adjustment amount determined by the network device based on a reception of a message 1 (msg1) sent by the terminal device.

The processing module 701 is specifically configured to determine the first common time slot offset as the target time slot offset used for uplink scheduling in condition of the terminal device having the TA pre-compensation capability.

The processing module 701 is specifically configured to determine a sum of the first common TA and the first TA adjustment amount as the target time slot offset used for uplink scheduling in condition of the terminal device not having the TA pre-compensation capability.

In some embodiments, the first common time slot offset may be a timing advance (TA) value determined by the network device based on a ground reference point 1; the first common TA may be a TA value determined by the network device based on a ground reference point 2.

In some embodiments, the first common time slot offset and the first common TA are carried in a system message.

In some embodiments, the transceiver module 702 is further configured to receive a first random access channel (RACH) resource set and a second RACH resource set sent by the network device, where the first RACH resource set is configured for the terminal device having the TA pre-compensation capability to send a message 1, and the second RACH resource set is configured for the terminal device not having the TA pre-compensation capability to send the message 1.

The transceiver module 702 is further configured to send the message 1 to the network device with the first RACH resource set or the second RACH resource set depending on whether the terminal device has the TA pre-compensation capability.

In some embodiments, the transceiver module 702 is specifically configured to select a RACH resource from the first RACH resource set and send the message 1 to the network device in condition of the terminal device having the TA pre-compensation capability.

The transceiver module 702 is specifically configured to select a RACH resource from the second RACH resource set and send the message 1 to the network device in condition of the terminal device not having the TA pre-compensation capability.

In some embodiments, the transceiver module 702 is specifically configured to perform TA compensation with the first estimated TA, select a RACH resource from the first RACH resource set, and send the message 1 to the network device in condition of the terminal device having the TA pre-compensation capability.

The transceiver module 702 is specifically configured to perform TA compensation with the first common TA, select a RACH resource from the second RACH resource set, and send the message 1 to the network device in condition of the terminal device not having the TA pre-compensation capability.

In some embodiments, the transceiver module 702 is further configured to receive a first time slot offset sent by the network device; where the first time slot offset is determined by the network device based on the target time slot offset used by the terminal device.

In some embodiments, the first time slot offset is an increment determined by the network device relative to the first common time slot offset in condition of the terminal device having the TA pre-compensation capability.

The first time slot offset is an increment determined by the network device relative to the TA actually used by the terminal device when sending a message 3 in condition of the terminal device not having the TA pre-compensation capability.

In some embodiments, the processing module 701 is further configured to determine a first time-domain resource location of uplink scheduling.

In some embodiments, the processing module 701 is specifically configured to determine the first time-domain resource location of uplink scheduling based on a first time slot number, the first time slot offset, the first common time slot offset, and $\Delta_1$ in condition of the terminal device having the TA pre-compensation capability.

The processing module 701 is specifically configured to determine the first time-domain resource location of uplink scheduling based on the first time slot number, the first time slot offset, the first common TA, the first TA adjustment amount, and $\Delta_1$ in condition of the terminal device not having the TA pre-compensation capability.

The first time slot number is a downlink time slot number corresponding to the PDSCH of the terminal device receiving the message 2; the value of $\Delta_1$ is taken with respect to an uplink subcarrier interval.

In some embodiments, the processing module 701 is specifically configured to determine a sum of the first time slot number, the first time slot offset, the first common time slot offset, and $\Delta_1$ as the first time-domain resource location corresponding to the PUSCH of uplink scheduling.

The processing module 701 is specifically configured to determine a sum of the first time slot number, the first time slot offset, the first common TA, the first TA adjustment amount, and $\Delta_1$ as the first time-domain resource location corresponding to the PUSCH of uplink scheduling.

In some embodiments, the transceiver module 702 is further configured to send the message 3 according to the first time-domain resource location corresponding to the PUSCH of uplink scheduling.

In some embodiments, in a case where the terminal device is applied to a two-step random access, the transceiver module 702 is configured to receive a second common time slot offset, a second common TA, and a second TA adjustment amount sent by a network device. The second TA adjustment amount is a TA adjustment amount determined by the network device based on a reception of a message A sent by the terminal device.

The processing module 701 is specifically configured to determine a sum of a second estimated TA and the second TA adjustment amount as the target time slot offset used for uplink scheduling, in condition of the terminal device having the TA pre-compensation capability and the second estimated TA being uploaded in the message A.

The processing module 701 is specifically configured to determine the second common time slot offset as the target time slot offset used for uplink scheduling, in condition of the terminal device having the TA pre-compensation capability and the second estimated TA not being uploaded in the message A.

The processing module 701 is specifically configured to determine a sum of the second common TA and the second TA adjustment amount as the target time slot offset used for uplink scheduling in condition of the terminal device not having the TA pre-compensation capability.

In some embodiments, the second common time slot offset may be a timing advance (TA) value determined by the network device based on a ground reference point 3; the second common TA may be a TA value determined by the network device based on a ground reference point 4.

In some embodiments, the second common time slot offset and the second common TA are carried in a system message.

In some embodiments, the transceiver module 702 is further configured for the terminal device to receive a third random access channel (RACH) resource set and a fourth RACH resource set sent by the network device, where the third RACH resource set is configured for the terminal device having the TA pre-compensation capability to send a message A, and the fourth RACH resource set is configured for the terminal device not having the TA pre-compensation capability to send the message A.

The transceiver module 702 is further configured to send the message A to the network device with the third RACH resource set or the fourth RACH resource set depending on whether the terminal device has the TA pre-compensation capability.

In some embodiments, the transceiver module 702 is specifically configured for the terminal device to perform TA compensation with the second estimated TA, select a RACH resource from the third RACH resource set, and send the message A to the network device in condition of the terminal device having the TA pre-compensation capability. The message A carries the second estimated TA.

The transceiver module 702 is specifically configured for the terminal device to perform TA compensation with the second estimated TA, select a RACH resource from the third RACH resource set, and send the message A to the network device in condition of the terminal device having the TA pre-compensation capability. The message A does not carry the second estimated TA.

The transceiver module 702 is specifically configured for the terminal device to perform TA compensation with the second common TA, select a RACH resource from the fourth RACH resource set, and send the message A to the network device in condition of the terminal device not having the TA pre-compensation capability.

In some embodiments, the transceiver module 702 is further configured to receive a second time slot offset sent by the network device, where the second time slot offset is determined by the network device based on the target time slot offset used by the terminal device.

In some embodiments, the second time slot offset is an increment determined by the network device relative to the TA actually used by the terminal device when sending the uplink transmission scheduled by the message B, in condition of the terminal device having the TA pre-compensation capability and the second estimated TA being uploaded in the message A.

The second time slot offset is an increment determined by the network device relative to the second common time slot offset, in condition of the terminal device having the TA pre-compensation capability and the second estimated TA not being uploaded in the message A.

The second time slot offset is an increment determined by the network device relative to the TA actually used by the terminal device when sending the uplink transmission scheduled by the message B, in condition of the terminal device not having the TA pre-compensation capability.

In some embodiments, the processing module 701 is further configured to determine a second time-domain resource location of uplink scheduling.

In some embodiments, the processing module 701 is specifically configured to determine the second time-domain resource location of uplink scheduling based on a second time slot number, the second time slot offset, the second estimated TA, the second TA adjustment amount, and $\Delta_2$, in condition of the terminal device having the TA pre-compensation capability and the second estimated TA being uploaded in the message A.

The processing module 701 is specifically configured to determine the second time-domain resource location of uplink scheduling based on the second time slot number, the second time slot offset, the second common time slot offset, and $\Delta_2$, in condition of the terminal device having the TA pre-compensation capability and the second estimated TA not being uploaded in the message A.

The processing module 701 is specifically configured to determine the second time-domain resource location of uplink scheduling based on the second time slot number, the second time slot offset, the second common TA, the second TA adjustment amount, and $\Delta_2$, in condition of the terminal device not having the TA pre-compensation capability.

The second time slot number is a downlink time slot number corresponding to the PDSCH of the terminal device receiving the message B; the value of $\Delta_2$ is taken with respect to an uplink subcarrier interval.

In some embodiments, the processing module 701 is specifically configured to determine a sum of the second time slot number, the second time slot offset, the second estimated TA, the second TA adjustment amount, and $\Delta_2$ as the second time-domain resource location corresponding to the PUSCH of uplink scheduling.

The processing module 701 is specifically configured to determine a sum of the second time slot number, the second time slot offset, the second common time slot offset, and $\Delta_2$ as the second time-domain resource location corresponding to the PUSCH of uplink scheduling.

The processing module 701 is specifically configured to determine a sum of the second time slot number, the second time slot offset, the second common TA, the second TA adjustment amount, and $\Delta_2$ as the second time-domain resource location corresponding to the PUSCH of uplink scheduling.

In some embodiments, the transceiver module 702 is further configured to send the message B according to the second time-domain resource location corresponding to the PUSCH of uplink scheduling.

In some embodiments, the processing module 701 is configured to determine the TA of the terminal device as a target time slot offset used for uplink scheduling.

In some embodiments, the transceiver module 702 is configured to receive a third time slot offset sent by the network device, where the third time slot offset is an increment determined by the network device relative to the TA of the terminal device.

In some embodiments, with the terminal device in a connected state, the target time slot offset is an offset used by the uplink scheduling PUSCH time domain resources.

In some embodiments, the processing module 701 is further configured to determine the third time-domain resource location of uplink scheduling according to $$\left\lfloor n_3 \cdot \frac{2^{\mu_{PUSCH}}}{2^{\mu_{PDCCH}}} \right\rfloor + k_2 + TA.$$

The third time slot number $n_3$ is a downlink time slot number corresponding to the PDCCH received by the terminal device indicating uplink scheduling, $k_2$ is the third time slot offset, and $\mu_{PUSCH}$ and $\mu_{PDCCH}$ are the subcarrier interval configurations of the PUSCH and PDCCH, respectively.

In some embodiments, the target time slot offset is an offset used by the PUCCH for the ACK/NACK feedback.

In some embodiments, the processing module 701 is further configured to determine a fourth time-domain resource location corresponding to the PUCCH for the ACK/NACK feedback based on a sum of the fourth time slot number, the fourth time slot offset, and TA; the fourth time slot number is a downlink time slot number corresponding to the PDSCH received by the terminal device.

Figure 8:
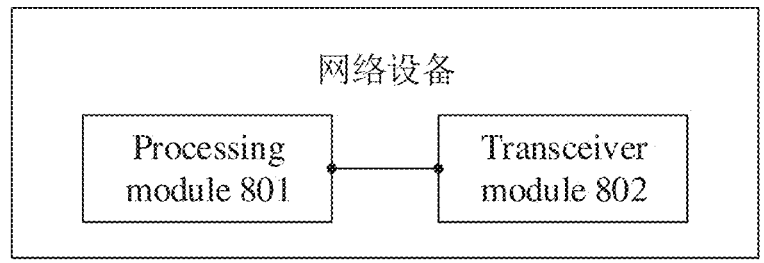
FIG. 8 is a schematic view of a network device according to an embodiment of the present disclosure.

Referring to FIG. 8, FIG. 8 is a schematic view of a network device according to an embodiment of the present disclosure. The network device may include the following elements.

A processing module 801 and a transceiver module 802.

In some embodiments, the processing module 801 is configured to obtain a target time slot offset used for uplink scheduling, the target time slot offset being determined by a terminal device based on whether the terminal device has a TA pre-compensation capability.

In some embodiments, in a case where the terminal device is applied to a four-step random access, the transceiver module 802 is configured to send a first common time slot offset, a first common TA, and a first TA adjustment amount to the terminal device. The first TA adjustment amount is a TA adjustment amount determined by the network device based on a reception of a message 1 sent by the terminal device.

The target time slot offset is the first common time slot offset determined by the terminal device in condition of the terminal device having the TA pre-compensation capability.

The target time slot offset is a sum of the first common TA and the first TA adjustment amount determined by the terminal device in condition of the terminal device not having the TA pre-compensation capability.

In some embodiments, the first common time slot offset may be a timing advance (TA) value determined by the network device based on a ground reference point 1; the first common TA may be a TA value determined by the network device based on a ground reference point 2.

In some embodiments, the first common time slot offset and the first common TA are carried in a system message.

In some embodiments, the transceiver module 802 is further configured to send a first random access channel (RACH) resource set and a second RACH resource set to the terminal device, where the first RACH resource set is configured for the terminal device having the TA pre-compensation capability to send a message 1, and the second RACH resource set is configured for the terminal device not having the TA pre-compensation capability to send the message 1.

The transceiver module 802 is further configured to receive the message 1 sent by the terminal device.

In some embodiments, the message 1 is sent to the network device by the terminal device selecting a RACH resource from the first RACH resource set in condition of the terminal device having the TA pre-compensation capability.

The message 1 is sent to the network device by the terminal device selecting a RACH resource from the second RACH resource set in condition of the terminal device not having the TA pre-compensation capability.

In some embodiments, the message 1 is sent to the network device by the terminal device performing TA compensation with the first estimated TA and selecting a RACH resource from the first RACH resource set, in condition of the terminal device having the TA pre-compensation capability.

The message 1 is sent to the network device by the terminal device performing TA compensation with the first common TA and selecting a RACH resource from the second RACH resource set, in condition of the terminal device not having the TA pre-compensation capability.

In some embodiments, the transceiver module 802 is further configured to send a first time slot offset to the terminal device; where the first time slot offset is determined by the network device based on the target time slot offset used by the terminal device.

In some embodiments, the first time slot offset is an increment determined by the network device relative to the first common time slot offset in condition of the terminal device having the TA pre-compensation capability.

The first time slot offset is an increment determined by the network device relative to the TA actually used by the terminal device when sending a message 3 in condition of the terminal device not having the TA pre-compensation capability.

In some embodiments, the transceiver module 802 is further configured to receive the messages 3 sent by the terminal device at a first time-domain resource location of uplink scheduling.

In some embodiments, the first time-domain resource location of uplink scheduling is determined by the terminal device based on a first time slot number, the first time slot offset, the first common time slot offset, and $\Delta_1$, in condition of the terminal device having the TA pre-compensation capability.

The first time-domain resource location of uplink scheduling is determined by the terminal device based on the first time slot number, the first time slot offset, the first common TA, the first TA adjustment amount, and $\Delta_1$ in condition of the terminal device not having the TA pre-compensation capability.

The first time slot number is a downlink time slot number corresponding to the PDSCH of the terminal device receiving the message 2; the value of $\Delta_1$ is taken with respect to an uplink subcarrier interval.

In some embodiments, the first time-domain resource location of uplink scheduling is determined by the terminal device based on a sum of the first time slot number, the first time slot offset, the first common time slot offset, and $\Delta_1$.

The first time-domain resource location of uplink scheduling is determined by the terminal device based on a sum of the first time slot number, the first time slot offset, the first common TA, the first TA adjustment amount, and $\Delta_1$.

In some embodiments, the first time-domain resource location of uplink scheduling is the first time-domain resource location corresponding to the PUSCH of uplink scheduling.

In some embodiments, in a case where the terminal device is applied to a two-step random access, the transceiver module 802 is configured to send a second common time slot offset, a second common TA, and a second TA adjustment amount to the terminal device. The second TA adjustment amount is a TA adjustment amount determined by the network device based on a reception of a message A sent by the terminal device.

The target time slot offset is a sum of a second estimated TA and the second TA adjustment amount in condition of the terminal device having the TA pre-compensation capability and the second estimated TA being uploaded in the message A.

The target time slot offset is the second common time slot offset determined by the terminal device in condition of the terminal device having the TA pre-compensation capability and the second estimated TA not being uploaded in the message A.

The target time slot offset is a sum of the second common TA and the second TA adjustment determined by the terminal device in condition of the terminal device not having the TA pre-compensation capability.

In some embodiments, the second common time slot offset may be a timing advance (TA) value determined by the network device based on a ground reference point 3; the second common TA may be a TA value determined by the network device based on a ground reference point 4.

In some embodiments, the second common time slot offset and the second common TA are carried in a system message.

In some embodiments, the transceiver module 802 is further configured to send a third random access channel (RACH) resource set and a fourth RACH resource set to the terminal device, where the third RACH resource set is configured for the terminal device having the TA pre-compensation capability to send a message A, and the fourth RACH resource set is configured for the terminal device not having the TA pre-compensation capability to send the message A.

The transceiver module 802 is further configured to receive the message A sent by the terminal device.

In some embodiments, the message A is sent to the network device by the terminal device performing TA compensation with the second estimated TA and selecting a RACH resource from the third RACH resource set, in condition of the terminal device having the TA pre-compensation capability. The message A carries the second estimated TA.

The message A is sent to the network device by the terminal device performing TA compensation with the second estimated TA and selecting a RACH resource from the third RACH resource set, in condition of the terminal device having the TA pre-compensation capability. The message A does not carry the second estimated TA.

The message A is sent to the network device by the terminal device performing TA compensation with the second common TA and selecting a RACH resource from the fourth RACH resource set in condition of the terminal device not having the TA pre-compensation capability.

In some embodiments, the transceiver module 802 is further configured to send a second time slot offset to the terminal device, where the second time slot offset is determined by the network device based on the target time slot offset used by the terminal device.

In some embodiments, the second time slot offset is an increment determined by the network device relative to the TA actually used by the terminal device when sending the uplink transmission scheduled by the message B, in condition of the terminal device having the TA pre-compensation capability and the second estimated TA being uploaded in the message A.

The second time slot offset is an increment determined by the network device relative to the second common time slot offset, in condition of the terminal device having the TA pre-compensation capability and the second estimated TA not being uploaded in the message A.

The second time slot offset is an increment determined by the network device relative to the TA actually used by the terminal device when sending the uplink transmission scheduled by the message B, in condition of the terminal device not having the TA pre-compensation capability.

In some embodiments, the transceiver module 802 is further configured to receive the message B sent by the terminal device at a second time-domain resource location of uplink scheduling.

In some embodiments, the second time-domain resource location of uplink scheduling is determined by the terminal device based on a second time slot number, the second time slot offset, the second estimated TA, the second TA adjustment amount, and $\Delta_2$, in condition of the terminal device having the TA pre-compensation capability and the second estimated TA being uploaded in the message A.

The second time-domain resource location of uplink scheduling is determined by the terminal device based on the second time slot number, the second time slot offset, the second common time slot offset, and $\Delta_2$, in condition of the terminal device having the TA pre-compensation capability and the second estimated TA not being uploaded in the message A.

The second time-domain resource location of uplink scheduling is determined by the terminal device based on the second time slot number, the second time slot offset, the second common TA, the second TA adjustment amount, and $\Delta_2$, in condition of the terminal device not having the TA pre-compensation capability.

The second time slot number is a downlink time slot number corresponding to the PDSCH of the terminal device receiving the message B, the value of $\Delta_2$ is taken with respect to an uplink subcarrier interval.

In some embodiments, the second time-domain resource location of uplink scheduling is determined by the terminal device to be a sum of the second time slot number, the second time slot offset, the second estimated TA, the second TA adjustment amount, and $\Delta_2$.

The second time-domain resource location of uplink scheduling is determined by the terminal device to be a sum of the second time slot number, the second time slot offset, the second common time slot offset, and $\Delta_2$.

The second time-domain resource location of uplink scheduling is determined by the terminal device to be a sum of the second time slot number, the second time slot offset, the second common TA, the second TA adjustment amount, and $\Delta_2$.

In some embodiments, the second time-domain resource location of uplink scheduling is the second time-domain resource location corresponding to the PUSCH of uplink scheduling.

In some embodiments, the processing module 801 is configured to obtain the target time slot offset used for uplink scheduling, the target time slot offset being the TA of the terminal device determined by the terminal device.

In some embodiments, the transceiver module 802 is configured to send a third time slot offset to the terminal device, where the third time slot offset is an increment determined by the network device relative to the TA of the terminal device.

In some embodiments, with the terminal device in a connected state, the target time slot offset is an offset used by the uplink scheduling PUSCH time domain resources.

In some embodiments, the third time slot offset is configured for the terminal device to determine the third time-domain resource location of uplink scheduling according to $$\left\lfloor n_3 \cdot \frac{2^{\mu_{PUSCH}}}{2^{\mu_{PDCCH}}} \right\rfloor + k_2 + TA.$$

The third time slot number $n_3$ is a downlink time slot number corresponding to the PDCCH received by the terminal device indicating uplink scheduling, $k_2$ is the third time slot offset, and $\mu_{PUSCH}$ and $\mu_{PDCCH}$ are the subcarrier interval configurations of the PUSCH and PDCCH, respectively.

In some embodiments, the target time slot offset is an offset used by the PUCCH for the ACK/NACK feedback.

In some embodiments, the fourth time slot offset is configured for the terminal device to determine a fourth time-domain resource location corresponding to the PUCCH for the ACK/NACK feedback based on a sum of the fourth time slot number, the fourth time slot offset, and the TA; the fourth time slot number is a downlink time slot number corresponding to the PDSCH received by the terminal device.

Figure 9:
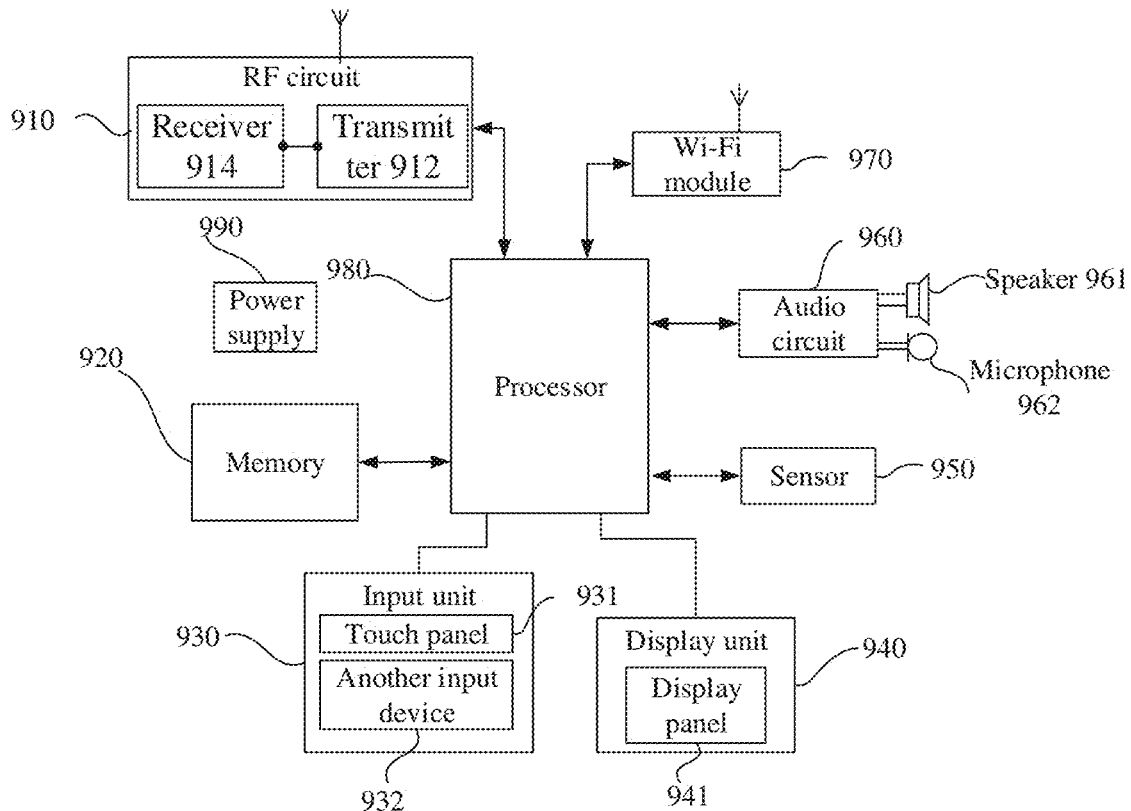
FIG. 9 is a schematic view of a terminal device according to another embodiment of the present disclosure.

Corresponding to the method of at least one of the above embodiments applied to a terminal device, the embodiments of the present disclosure further provide one or more terminal devices. The terminal device of the embodiments of the present disclosure can implement any one of the above methods of implementation. Referring to FIG. 9. FIG. 9 is a schematic view of a terminal device according to another embodiment of the present disclosure. The terminal device is illustrated with a mobile phone, and may include: a radio frequency (RF) circuit 910, a memory 920, an input unit 930, a display unit 940, a sensor 950, an audio circuit 960, a wireless fidelity (Wi-Fi) module 970, a processor 980, a power supply 990, and other components. The RF circuit 910 includes a receiver 914 and a transmitter 912. It can be understood by those skilled in the at that the structure of the mobile phone illustrated in FIG. 9 does not constitute a limitation of the mobile phone and may include more or fewer components than illustrated, or a combination of certain components, or a different arrangement of components.

Each component of the mobile phone is described in detail below in relation to FIG. 9.

The RF circuit 910 may be configured for receiving and sending signals during sending and receiving messages or calls, in particular, receiving downlink information from the base station and passing the downlink information to the processor 980 for processing; in addition, sending uplink data to the base station. Conventionally, the RF circuit 910 includes, but is not limited to, an antenna, at least one amplifier, a transceiver, a coupler, a low noise amplifier (LNA), a duplexer, etc. In addition, the RF circuit 910 may communicate with networks and other devices via wireless communication. The above wireless communications may adopt any of the communication standards or protocols, including but not limited to global system of mobile communication (GSM), general packet radio service (GPRS), code division multiple access (CDMA), wideband code division multiple access (WCDMA), long term evolution (LTE), e-mail, short messaging service (SMS), etc.

The memory 920 may be configured to store software programs and modules, and the processor 980 performs various functional applications and data processing of the mobile phone by running the software programs and modules stored in the memory 920. The memory 920 may primarily include a memory program area and a memory data area, where the memory program area may store the operating system, applications required for at least one function (e.g., sound playback function, image playback function, etc.), etc., and the memory data area may store data created based on the use of the mobile phone (e.g., audio data, phone book, etc.), etc. In addition, the memory 920 may include high-speed random-access memory, and may also include non-volatile memory, such as at least one disk memory device, flash memory device, or other volatile solid state memory device.

The input unit 930 may be configured to receive input numeric or character information, as well as to generate key signal input related to user settings of the mobile phone and control of functions. Specifically, the input unit 930 may include a touch panel 931 and another input device 932. The touch panel 931, also referred to as a touch screen, may collect user touch operations on or near it (e.g., user operations on or near the touch panel 931 using any suitable object or attachment such as a finger, stylus, etc.) and drive a corresponding connection device according to a predetermined program. In some embodiments, the touch panel 931 may include a touch detection device and a touch controller. The touch detection device detects the user's touch orientation, detects the signal brought by the touch operation, and sends the signal to the touch controller. The touch controller receives the touch information from the touch detection device, converts it into contact coordinates, and sends it to the processor 980; the touch controller may further receive commands from the processor 980 and execute them. In addition, a variety of types of resistive, capacitive, infrared, and surface acoustic wave may be applied to implement the touch panel 931. In addition to the touch panel 931, the input unit 930 may further include the other input device 932. Specifically, the input device 932 may include, but is not limited to, one or more of a physical keyboard, a function key (such as volume control button, switch button, etc.), a trackball, a mouse, a joystick, etc.

The display unit 940 may be configured to display information entered by or provided to the user and various menus of the mobile phone. The display unit 940 may include a display panel 941, and in some embodiments, the display panel 941 may be configured in the form of a liquid crystal display (LCD), an organic light-emitting diode (OLED), etc. Further, the touch panel 931 may cover the display panel 941. When the touch panel 931 detects a touch operation on or near it, the signal is transmitted to the processor 980 to determine the type of touch event, and subsequently the processor 980 provides a corresponding visual output on the display panel 941 based on the type of the touch event. Although in FIG. 9, the touch panel 931 and the display panel 941 serve as two separate components to implement the input and input functions of the mobile phone, in some embodiments, the touch panel 931 may be integrated with the display panel 941 to implement the input and output functions of the mobile phone.

The mobile phone may further include at least one sensor 950, such as a light sensor, a motion sensor, and other sensors. Specifically, the light sensor may include an ambient light sensor and a proximity sensor, where the ambient light sensor may adjust the brightness of the display panel 941 based on the brightness of the ambient light, and the proximity sensor may turn off the display panel 941 and/or the backlight when the mobile phone is moved to the ear. As a kind of motion sensor, the accelerometer sensor can detect the magnitude of acceleration in all directions (generally three axes), and the magnitude and direction of gravity when stationary, which can be used for applications that identify the mobile phone's posture (such as horizontal and vertical screen switching, related games, magnetometer posture calibration), vibration recognition-related functions (such as pedometer, tapping), etc. The mobile phone may further be arranged with gyroscope, barometer, hygrometer, thermometer, infrared sensor and other sensors, which will not be repeated herein.

The audio circuit 960, the speaker 961, and the microphone 962 may provide an audio interface between the user and the mobile phone. The audio circuit 960 may transmit the received audio data converted into electrical signals to the speaker 961, which is then converted into sound signals for output; on the other hand, the microphone 962 converts the collected sound signals into electrical signals, which are received by the audio circuit 960 and converted into audio data. The audio data is output to the processor 980 for processing and then sent via the RF circuit 910 to, for example, another phone; or output to the memory 920 for further processing.

Wi-Fi is a short-range wireless transmission technology, and the mobile phone can help the user send and receive emails, browse the web, and access streaming media, etc. through the Wi-Fi module 970, which provides wireless broadband Internet access to the user. Although FIG. 9 illustrates the Wi-Fi module 970, it is understood that it is not a necessary component of the mobile phone and can be omitted entirely as needed to the extent that it does not change the essence of the present disclosure.

The processor 980 is a control center of the mobile phone and connects various parts of the entire mobile phone using various interfaces and lines to perform various functions and process data of the mobile phone by running or executing software programs and/or modules stored in the memory 920 and calling data stored in the memory 920, thereby providing overall monitoring of the mobile phone. In some embodiments, the processor 980 may include one or more processing units; in further some embodiments, the processor 980 may integrate an application processor and a modem processor, where the application processor primarily handles the operating system, user interface, and applications, etc., and the modem processor primarily handles wireless communications. It can be understood that the above modem processor may also not be integrated into the processor 980.

The mobile phone further includes a power supply 990 (e.g., a battery) to power various components. In some embodiments, the power supply may be logically connected to the processor 980 via a power management system such that functions such as managing charging, discharging, and power consumption management are implemented via the power management system. Although not shown, the mobile phone may further include a camera, Bluetooth module, etc., which will not be described herein.

In the embodiments of the present disclosure, the processor 980 is configured to determine a target time slot offset used for uplink scheduling based on whether the terminal device has a TA pre-compensation capability.

In some embodiments, in a case where the terminal device is applied to a four-step random access, the RF circuit 910 is configured to receive a first common time slot offset, a first common TA, and a first TA adjustment amount sent by a network device. The first TA adjustment amount is a TA adjustment amount determined by the network device based on a reception of a message 1 (msg1) sent by the terminal device.

The processor 980 is specifically configured to determine the first common time slot offset as the target time slot offset used for uplink scheduling in condition of the terminal device having the TA pre-compensation capability.

The processor 980 is specifically configured to determine a sum of the first common TA and the first TA adjustment amount as the target time slot offset used for uplink scheduling in condition of the terminal device not having the TA pre-compensation capability.

In some embodiments, the first common time slot offset may be a timing advance (TA) value determined by the network device based on a ground reference point 1; the first common TA may be a TA value determined by the network device based on a ground reference point 2.

In some embodiments, the first common time slot offset and the first common TA are carried in a system message.

In some embodiments, the RF circuit 910 is further configured to receive a first random access channel (RACH) resource set and a second RACH resource set sent by the network device, where the first RACH resource set is configured for the terminal device having the TA pre-compensation capability to send a message 1, and the second RACH resource set is configured for the terminal device not having the TA pre-compensation capability to send the message 1.

The RF circuit 910 is further configured to send the message 1 to the network device with the first RACH resource set or the second RACH resource set depending on whether the terminal device has the TA pre-compensation capability.

In some embodiments, the RF circuit 910 is specifically configured to select a RACH resource from the first RACH resource set and send the message 1 to the network device in condition of the terminal device having the TA pre-compensation capability.

The RF circuit 910 is specifically configured to select a RACH resource from the second RACH resource set and send the message 1 to the network device in condition of the terminal device not having the TA pre-compensation capability.

In some embodiments, the RF circuit 910 is specifically configured to perform TA compensation with the first estimated TA, select a RACH resource from the first RACH resource set, and send the message 1 to the network device in condition of the terminal device having the TA pre-compensation capability.

The RF circuit 910 is specifically configured to perform TA compensation with the first common TA, select a RACH resource from the second RACH resource set, and send the message 1 to the network device in condition of the terminal device not having the TA pre-compensation capability.

In some embodiments, the RF circuit 910 is further configured to receive a first time slot offset sent by the network device; where the first time slot offset is determined by the network device based on the target time slot offset used by the terminal device.

In some embodiments, the first time slot offset is an increment determined by the network device relative to the first common time slot offset in condition of the terminal device having the TA pre-compensation capability.

The first time slot offset is an increment determined by the network device relative to the TA actually used by the terminal device when sending a message 3 in condition of the terminal device not having the TA pre-compensation capability.

In some embodiments, the processor 980 is further configured to determine a first time-domain resource location of uplink scheduling.

In some embodiments, the processor 980 is specifically configured to determine the first time-domain resource location of uplink scheduling based on a first time slot number, the first time slot offset, the first common time slot offset, and $\Delta_1$ in condition of the terminal device having the TA pre-compensation capability.

The processor 980 is specifically configured to determine the first time-domain resource location of uplink scheduling based on the first time slot number, the first time slot offset, the first common TA, the first TA adjustment amount, and $\Delta_1$ in condition of the terminal device not having the TA pre-compensation capability.

The first time slot number is a downlink time slot number corresponding to the PDSCH of the terminal device receiving the message 2; the value of $\Delta_1$ is taken with respect to an uplink subcarrier interval.

In some embodiments, the processor 980 is specifically configured to determine a sum of the first time slot number, the first time slot offset, the first common time slot offset, and $\Delta_1$ as the first time-domain resource location corresponding to the PUSCH of uplink scheduling.

The processor 980 is specifically configured to determine a sum of the first time slot number, the first time slot offset, the first common TA, the first TA adjustment amount, and $\Delta_1$ as the first time-domain resource location corresponding to the PUSCH of uplink scheduling.

In some embodiments, the RF circuit 910 is further configured to send the message 3 according to the first time-domain resource location corresponding to the PUSCH of uplink scheduling.

In some embodiments, in a case where the terminal device is applied to a two-step random access, the RF circuit 910 is configured to receive a second common time slot offset, a second common TA, and a second TA adjustment amount sent by a network device. The second TA adjustment amount is a TA adjustment amount determined by the network device based on a reception of a message A sent by the terminal device.

The processor 980 is specifically configured to determine a sum of a second estimated TA and the second TA adjustment amount as the target time slot offset used for uplink scheduling, in condition of the terminal device having the TA pre-compensation capability and the second estimated TA being uploaded in the message A.

The processor 980 is specifically configured to determine the second common time slot offset as the target time slot offset used for uplink scheduling, in condition of the terminal device having the TA pre-compensation capability and the second estimated TA not being uploaded in the message A.

The processor 980 is specifically configured to determine a sum of the second common TA and the second TA adjustment amount as the target time slot offset used for uplink scheduling in condition of the terminal device not having the TA pre-compensation capability.

In some embodiments, the second common time slot offset may be a timing advance (TA) value determined by the network device based on a ground reference point 3; the second common TA may be a TA value determined by the network device based on a ground reference point 4.

In some embodiments, the second common time slot offset and the second common TA are carried in a system message.

In some embodiments, the RF circuit 910 is further configured for the terminal device to receive a third random access channel (RACH) resource set and a fourth RACH resource set sent by the network device, where the third RACH resource set is configured for the terminal device having the TA pre-compensation capability to send a message A, and the fourth RACH resource set is configured for the terminal device not having the TA pre-compensation capability to send the message A.

The RF circuit 910 is further configured to send the message A to the network device with the third RACH resource set or the fourth RACH resource set depending on whether the terminal device has the TA pre-compensation capability.

In some embodiments, the RF circuit 910 is specifically configured for the terminal device to perform TA compensation with the second estimated TA, select a RACH resource from the third RACH resource set, and send the message A to the network device in condition of the terminal device having the TA pre-compensation capability. The message A carries the second estimated TA.

The RF circuit 910 is specifically configured for the terminal device to perform TA compensation with the second estimated TA, select a RACH resource from the third RACH resource set, and send the message A to the network device in condition of the terminal device having the TA pre-compensation capability. The message A does not carry the second estimated TA.

The RF circuit 910 is specifically configured for the terminal device to perform TA compensation with the second common TA, select a RACH resource from the fourth RACH resource set, and send the message A to the network device in condition of the terminal device not having the TA pre-compensation capability.

In some embodiments, the RF circuit 910 is further configured to receive a second time slot offset sent by the network device, where the second time slot offset is determined by the network device based on the target time slot offset used by the terminal device.

In some embodiments, the second time slot offset is an increment determined by the network device relative to the TA actually used by the terminal device when sending the uplink transmission scheduled by the message B, in condition of the terminal device having the TA pre-compensation capability and the second estimated TA being uploaded in the message A.

The second time slot offset is an increment determined by the network device relative to the second common time slot offset, in condition of the terminal device having the TA pre-compensation capability and the second estimated TA not being uploaded in the message A.

The second time slot offset is an increment determined by the network device relative to the TA actually used by the terminal device when sending the uplink transmission scheduled by the message B, in condition of the terminal device not having the TA pre-compensation capability.

In some embodiments, the processor 980 is further configured to determine a second time-domain resource location of uplink scheduling.

In some embodiments, the processor 980 is specifically configured to determine the second time-domain resource location of uplink scheduling based on a second time slot number, the second time slot offset, the second estimated TA, the second TA adjustment amount, and $\Delta_2$, in condition of the terminal device having the TA pre-compensation capability and the second estimated TA being uploaded in the message A.

The processor 980 is specifically configured to determine the second time-domain resource location of uplink scheduling based on the second time slot number, the second time slot offset, the second common time slot offset, and $\Delta_2$, in condition of the terminal device having the TA pre-compensation capability and the second estimated TA not being uploaded in the message A.

The processor 980 is specifically configured to determine the second time-domain resource location of uplink scheduling based on the second time slot number, the second time slot offset, the second common TA, the second TA adjustment amount, and $\Delta_2$, in condition of the terminal device not having the TA pre-compensation capability.

The second time slot number is a downlink time slot number corresponding to the PDSCH of the terminal device receiving the message B; the value of $\Delta_2$ is taken with respect to an uplink subcarrier interval.

In some embodiments, the processor 980 is specifically configured to determine a sum of the second time slot number, the second time slot offset, the second estimated TA, the second TA adjustment amount, and $\Delta_2$ as the second time-domain resource location corresponding to the PUSCH of uplink scheduling.

The processor 980 is specifically configured to determine a sum of the second time slot number, the second time slot offset, the second common time slot offset, and $\Delta_2$ as the second time-domain resource location corresponding to the PUSCH of uplink scheduling.

The processor 980 is specifically configured to determine a sum of the second time slot number, the second time slot offset, the second common TA, the second TA adjustment amount, and $\Delta_2$ as the second time-domain resource location corresponding to the PUSCH of uplink scheduling.

In some embodiments, the RF circuit 910 is further configured to send the message B according to the second time-domain resource location corresponding to the PUSCH of uplink scheduling.

In some embodiments, the processor 980 is configured to determine the TA of the terminal device as a target time slot offset used for uplink scheduling.

In some embodiments, the RF circuit 910 is configured to receive a third time slot offset sent by the network device, where the third time slot offset is an increment determined by the network device relative to the TA of the terminal device.

In some embodiments, with the terminal device in a connected state, the target time slot offset is an offset used by the uplink scheduling PUSCH time domain resources.

In some embodiments, the processor 980 is further configured to determine the third time-domain resource location of uplink scheduling according to $$\left\lfloor n_3 \cdot \frac{2^{\mu_{PUSCH}}}{2^{\mu_{PDCCH}}} \right\rfloor + k_2 + TA.$$

The third time slot number $n_3$ is a downlink time slot number corresponding to the PDCCH received by the terminal device indicating uplink scheduling, $k_2$ is the third time slot offset, and $\mu_{PUSCH}$ and $\mu_{PDCCH}$ are the subcarrier interval configurations of the PUSCH and PDCCH, respectively.

In some embodiments, the target time slot offset is an offset used by the PUCCH for the ACK/NACK feedback.

In some embodiments, the processor 980 is further configured to determine a fourth time-domain resource location corresponding to the PUCCH for the ACK/NACK feedback based on a sum of the fourth time slot number, the fourth time slot offset, and TA; the fourth time slot number is a downlink time slot number corresponding to the PDSCH received by the terminal device.

Figure 10:
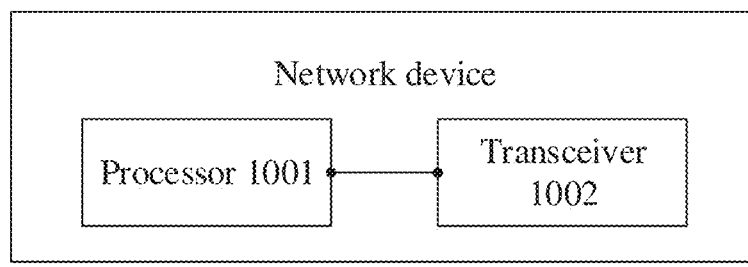
FIG. 10 is a schematic view of a network device according to another embodiment of the present disclosure.

Referring to FIG. 10. FIG. 10 is a schematic view of a network device according to another embodiment of the present disclosure. The network device may include the following elements.

A processor 1001 and a transceiver 1002.

In some embodiments, the processor 1001 is configured to obtain a target time slot offset used for uplink scheduling, the target time slot offset being determined by a terminal device based on whether the terminal device has a TA pre-compensation capability.

In some embodiments, in a case where the terminal device is applied to a four-step random access, the transceiver 1002 is configured to send a first common time slot offset, a first common TA, and a first TA adjustment amount to the terminal device. The first TA adjustment amount is a TA adjustment amount determined by the network device based on a reception of a message 1 sent by the terminal device.

The target time slot offset is the first common time slot offset determined by the terminal device in condition of the terminal device having the TA pre-compensation capability.

The target time slot offset is a sum of the first common TA and the first TA adjustment amount determined by the terminal device in condition of the terminal device not having the TA pre-compensation capability.

In some embodiments, the first common time slot offset may be a timing advance (TA) value determined by the network device based on a ground reference point 1; the first common TA may be a TA value determined by the network device based on a ground reference point 2.

In some embodiments, the first common time slot offset and the first common TA are carried in a system message.

In some embodiments, the transceiver 1002 is further configured to send a first random access channel (RACH) resource set and a second RACH resource set to the terminal device, where the first RACH resource set is configured for the terminal device having the TA pre-compensation capability to send a message 1, and the second RACH resource set is configured for the terminal device not having the TA pre-compensation capability to send the message 1.

The transceiver 1002 is further configured to receive the message 1 sent by the terminal device.

In some embodiments, the message 1 is sent to the network device by the terminal device selecting a RACH resource from the first RACH resource set in condition of the terminal device having the TA pre-compensation capability.

The message 1 is sent to the network device by the terminal device selecting a RACH resource from the second RACH resource set in condition of the terminal device not having the TA pre-compensation capability.

In some embodiments, the message 1 is sent to the network device by the terminal device performing TA compensation with the first estimated TA and selecting a RACH resource from the first RACH resource set, in condition of the terminal device having the TA pre-compensation capability.

The message 1 is sent to the network device by the terminal device performing TA compensation with the first common TA and selecting a RACH resource from the second RACH resource set, in condition of the terminal device not having the TA pre-compensation capability.

In some embodiments, the transceiver 1002 is further configured to send a first time slot offset to the terminal device; where the first time slot offset is determined by the network device based on the target time slot offset used by the terminal device.

In some embodiments, the first time slot offset is an increment determined by the network device relative to the first common time slot offset in condition of the terminal device having the TA pre-compensation capability.

The first time slot offset is an increment determined by the network device relative to the TA actually used by the terminal device when sending a message 3 in condition of the terminal device not having the TA pre-compensation capability.

In some embodiments, the transceiver 1002 is further configured to receive the messages 3 sent by the terminal device at a first time-domain resource location of uplink scheduling.

In some embodiments, the first time-domain resource location of uplink scheduling is determined by the terminal device based on a first time slot number, the first time slot offset, the first common time slot offset, and $\Delta_1$, in condition of the terminal device having the TA pre-compensation capability.

The first time-domain resource location of uplink scheduling is determined by the terminal device based on the first time slot number, the first time slot offset, the first common TA, the first TA adjustment amount, and $\Delta_1$ in condition of the terminal device not having the TA pre-compensation capability.

The first time slot number is a downlink time slot number corresponding to the PDSCH of the terminal device receiving the message 2; the value of $\Delta_1$ is taken with respect to an uplink subcarrier interval.

In some embodiments, the first time-domain resource location of uplink scheduling is determined by the terminal device based on a sum of the first time slot number, the first time slot offset, the first common time slot offset, and $\Delta_1$.

The first time-domain resource location of uplink scheduling is determined by the terminal device based on a sum of the first time slot number, the first time slot offset, the first common TA, the first TA adjustment amount, and $\Delta_1$.

In some embodiments, the first time-domain resource location of uplink scheduling is the first time-domain resource location corresponding to the PUSCH of uplink scheduling.

In some embodiments, in a case where the terminal device is applied to two-step random access, the transceiver 1002 is configured to send a second common time slot offset, a second common TA, and a second TA adjustment amount to the terminal device. The second TA adjustment amount is a TA adjustment amount determined by the network device based on a reception of a message A sent by the terminal device.

The target time slot offset is a sum of a second estimated TA and the second TA adjustment amount in condition of the terminal device having the TA pre-compensation capability and the second estimated TA being uploaded in the message A.

The target time slot offset is the second common time slot offset determined by the terminal device in condition of the terminal device having the TA pre-compensation capability and the second estimated TA not being uploaded in the message A.

The target time slot offset is a sum of the second common TA and the second TA adjustment determined by the terminal device in condition of the terminal device not having the TA pre-compensation capability.

In some embodiments, the second common time slot offset may be a timing advance (TA) value determined by the network device based on a ground reference point 3; the second common TA may be a TA value determined by the network device based on a ground reference point 4.

In some embodiments, the second common time slot offset and the second common TA are carried in a system message.

In some embodiments, the transceiver 1002 is further configured to send a third random access channel (RACH) resource set and a fourth RACH resource set to the terminal device, where the third RACH resource set is configured for the terminal device having the TA pre-compensation capability to send a message A, and the fourth RACH resource set is configured for the terminal device not having the TA pre-compensation capability to send the message A.

The transceiver 1002 is further configured to receive the message A sent by the terminal device.

In some embodiments, the message A is sent to the network device by the terminal device performing TA compensation with the second estimated TA and selecting a RACH resource from the third RACH resource set, in condition of the terminal device having the TA pre-compensation capability. The message A carries the second estimated TA.

The message A is sent to the network device by the terminal device performing TA compensation with the second estimated TA and selecting a RACH resource from the third RACH resource set, in condition of the terminal device having the TA pre-compensation capability. The message A does not carry the second estimated TA.

The message A is sent to the network device by the terminal device performing TA compensation with the second common TA and selecting a RACH resource from the fourth RACH resource set in condition of the terminal device not having the TA pre-compensation capability.

In some embodiments, the transceiver 1002 is further configured to send a second time slot offset to the terminal device, where the second time slot offset is determined by the network device based on the target time slot offset used by the terminal device.

In some embodiments, the second time slot offset is an increment determined by the network device relative to the TA actually used by the terminal device when sending the uplink transmission scheduled by the message B, in condition of the terminal device having the TA pre-compensation capability and the second estimated TA being uploaded in the message A.

The second time slot offset is an increment determined by the network device relative to the second common time slot offset, in condition of the terminal device having the TA pre-compensation capability and the second estimated TA not being uploaded in the message A.

The second time slot offset is an increment determined by the network device relative to the TA actually used by the terminal device when sending the uplink transmission scheduled by the message B, in condition of the terminal device not having the TA pre-compensation capability.

In some embodiments, the transceiver 1002 is further configured to receive the message B sent by the terminal device at a second time-domain resource location of uplink scheduling.

In some embodiments, the second time-domain resource location of uplink scheduling is determined by the terminal device based on a second time slot number, the second time slot offset, the second estimated TA, the second TA adjustment amount, and $\Delta_2$, in condition of the terminal device having the TA pre-compensation capability and the second estimated TA being uploaded in the message A.

The second time-domain resource location of uplink scheduling is determined by the terminal device based on the second time slot number, the second time slot offset, the second common time slot offset, and $\Delta_2$, in condition of the terminal device having the TA pre-compensation capability and the second estimated TA not being uploaded in the message A.

The second time-domain resource location of uplink scheduling is determined by the terminal device based on the second time slot number, the second time slot offset, the second common TA, the second TA adjustment amount, and $\Delta_2$, in condition of the terminal device not having the TA pre-compensation capability.

The second time slot number is a downlink time slot number corresponding to the PDSCH of the terminal device receiving the message B; the value of $\Delta_2$ is taken with respect to an uplink subcarrier interval.

In some embodiments, the second time-domain resource location of uplink scheduling is determined by the terminal device to be a sum of the second time slot number, the second time slot offset, the second estimated TA, the second TA adjustment amount, and $\Delta_2$.

The second time-domain resource location of uplink scheduling is determined by the terminal device to be a sum of the second time slot number, the second time slot offset, the second common time slot offset, and $\Delta_2$.

The second time-domain resource location of uplink scheduling is determined by the terminal device to be a sum of the second time slot number, the second time slot offset, the second common TA, the second TA adjustment amount, and $\Delta_2$.

In some embodiments, the second time-domain resource location of uplink scheduling is the second time-domain resource location corresponding to the PUSCH of uplink scheduling.

In some embodiments, the processor 1001 is configured to obtain the target time slot offset used for uplink scheduling, the target time slot offset being the TA of the terminal device determined by the terminal device.

In some embodiments, the transceiver 1002 is configured to send a third time slot offset to the terminal device, where the third time slot offset is an increment determined by the network device relative to the TA of the terminal device.

In some embodiments, with the terminal device in a connected state, the target time slot offset is an offset used by the uplink scheduling PUSCH time domain resources.

In some embodiments, the third time slot offset is configured for the terminal device to determine the third time-domain resource location of uplink scheduling according to $$\left\lfloor n_3 \cdot \frac{2^{\mu_{PUSCH}}}{2^{\mu_{PDCCH}}} \right\rfloor + k_2 + TA.$$

The third time slot number $n_3$ is a downlink time slot number corresponding to the PDCCH received by the terminal device indicating uplink scheduling, $k_2$ is the third time slot offset, and $\mu_{PUSCH}$ and $\mu_{PDCCH}$ are the subcarrier interval configurations of the PUSCH and PDCCH, respectively.

In some embodiments, the target time slot offset is an offset used by the PUCCH for the ACK/NACK feedback.

In some embodiments, the fourth time slot offset is configured for the terminal device to determine a fourth time-domain resource location corresponding to the PUCCH for the ACK/NACK feedback based on a sum of the fourth time slot number, the fourth time slot offset, and the TA; the fourth time slot number is a downlink time slot number corresponding to the PDSCH received by the terminal device.

In the above embodiments, implementation may be in whole or in part by software, hardware, firmware, or any combination thereof. When implemented using software, the implementation may be in whole or in part in the form of a computer program product. The computer program product includes one or more computer instructions. Loading and executing the computer program instructions on a computer produces, in whole or in part, a process or function as described in accordance with embodiments of the present disclosure. The computer may be a general-purpose computer, a specialized computer, a computer network, or other programmable device. The computer instructions may be stored in a computer-readable storage medium or transmitted from one computer-readable storage medium to another computer-readable storage medium, e.g., the computer instructions may be transmitted from one website site, computer, server, or data center to another via wired (e.g., coaxial cable, fiber optic, digital subscriber line (DSL)) or wireless (e.g., infrared, wireless, microwave, etc.) means. The computer-readable storage medium may be any available media that a computer is capable of storing or a data storage device such as a server, data center, etc. that contains one or more available media integrated. The available media may be magnetic media, (e.g., floppy disk, hard disk, magnetic tape), optical media (e.g., DVD), or semiconductor media (e.g., solid state disk (SSD)), etc.

The terms "first", "second", "third", "fourth", etc. (if present) in the specification and claims and in the accompanying drawings of the present disclosure are intended to distinguish similar objects and need not be intended to describe a particular order or sequence. It should be understood that the data so used may be interchangeable where appropriate such that the embodiments described herein can be implemented in an order other than what is illustrated or described herein. In addition, the terms "including" and "having", and any variations thereof, are intended to cover non-exclusive inclusion, e.g., a process, method, system, product, or apparatus including a series of steps or units need not be limited to the steps or units that are clearly listed, but may include other steps or units that are not clearly listed or that are inherent to the process, method, product, or device.

What is claimed is:

1. A method for determining a time-domain resource of uplink transmission, comprising:
   determining, by a terminal device, a target time slot offset used for uplink scheduling based on whether the terminal device has a timing advance (TA) pre-compensation capability;
   in a case where the terminal device is applied to a four-step random access, the method further comprising:
      receiving, by the terminal device, a first common time slot offset, a first common TA, and a first TA adjustment amount sent by a network device; wherein the first TA adjustment amount is a TA adjustment amount determined by the network device based on a reception of a message 1 sent by the terminal device;
   wherein the determining, by a terminal device, a target time slot offset used for uplink scheduling based on whether the terminal device has a TA pre-compensation capability comprises:
      determining, by the terminal device, the first common time slot offset as the target time slot offset used for uplink scheduling in condition of the terminal device having the TA pre-compensation capability; and
      determining, by the terminal device, a sum of the first common TA and the first TA adjustment amount as the target time slot offset used for uplink scheduling in condition of the terminal device not having the TA pre-compensation capability;

wherein the method further comprises:
receiving, by the terminal device, a first time slot offset sent by the network device; wherein the first time slot offset is determined by the network device based on the target time slot offset used by the terminal device;
wherein the first time slot offset is an increment determined by the network device relative to the first common time slot offset in condition of the terminal device having the TA pre-compensation capability; and
the first time slot offset is an increment determined by the network device relative to a TA actually used by the terminal device when sending a message 3 in condition of the terminal device not having the TA pre-compensation capability;
wherein the method further comprises:
determining, by the terminal device, a first time-domain resource location of uplink scheduling;
wherein the determining, by the terminal device, a first time-domain resource location of uplink scheduling comprises:
determining, by the terminal device, the first time-domain resource location of uplink scheduling based on a first time slot number, the first time slot offset, the first common time slot offset, and $\Delta_1$, in condition of the terminal device having the TA pre-compensation capability; and
determining, by the terminal device, the first time-domain resource location of uplink scheduling based on the first time slot number, the first time slot offset, the first common TA, the first TA adjustment amount, and $\Delta_1$, in condition of the terminal device not having the TA pre-compensation capability;
wherein the first time slot number is a downlink time slot number corresponding to a physical downlink shared channel (PDSCH) of the terminal device receiving a message 2; a value of $\Delta_1$ is taken with respect to an uplink subcarrier interval.

2. The method according to claim 1, further comprising:
receiving, by the terminal device, a first random access channel (RACH) resource set and a second RACH resource set sent by the network device; wherein the first RACH resource set is configured for the terminal device having the TA pre-compensation capability to send the message 1, and the second RACH resource set is configured for the terminal device not having the TA pre-compensation capability to send the message 1; and
sending, by the terminal device, the message 1 to the network device with the first RACH resource set or the second RACH resource set depending on whether the terminal device has the TA pre-compensation capability.

3. The method according to claim 2, wherein the sending, by the terminal device, the message 1 to the network device with the first RACH resource set or the second RACH resource set depending on whether the terminal device has the TA pre-compensation capability comprises:
selecting, by the terminal device, a RACH resource from the first RACH resource set, and sending, by the terminal device, the message 1 to the network device, in condition of the terminal device having the TA pre-compensation capability; and
selecting, by the terminal device, a RACH resource from the second RACH resource set, and sending, by the terminal device, the message 1 to the network device, in condition of the terminal device not having the TA pre-compensation capability.

4. The method according to claim 3, wherein the selecting, by the terminal device, a RACH resource from the first RACH resource set, and sending, by the terminal device, the message 1 to the network device, in condition of the terminal device having the TA pre-compensation capability comprise:
performing, by the terminal device, TA compensation with a first estimated TA, selecting, by the terminal device, the RACH resource from the first RACH resource set, and sending, by the terminal device, the message 1 to the network device, in condition of the terminal device having the TA pre-compensation capability; and
wherein the selecting, by the terminal device, a RACH resource from the second RACH resource set, and sending, by the terminal device, the message 1 to the network device, in condition of the terminal device not having the TA pre-compensation capability comprise:
performing, by the terminal device, TA compensation with the first common TA, selecting, by the terminal device, the RACH resource from the second RACH resource set, and sending, by the terminal device, the message 1 to the network device, in condition of the terminal device not having the TA pre-compensation capability.

5. The method according to claim 1, wherein,
the determining, by the terminal device, the first time-domain resource location of uplink scheduling based on a first time slot number, the first time slot offset, the first common time slot offset, and $\Delta_1$ comprises:
determining, by the terminal device, a sum of the first time slot number, the first time slot offset, the first common time slot offset, and $\Delta_1$ as the first time-domain resource location corresponding to a physical uplink shared channel (PUSCH) of uplink scheduling; and
wherein the determining, by the terminal device, the first time-domain resource location of uplink scheduling based on the first time slot number, the first time slot offset, the first common TA, the first TA adjustment amount, and $\Delta_1$ comprises:
determining, by the terminal device, a sum of the first time slot number, the first time slot offset, the first common TA, the first TA adjustment amount, and $\Delta_1$ as the first time-domain resource location corresponding to the PUSCH of uplink scheduling.

6. The method according to claim 5, further comprising:
sending, by the terminal device, a message 3 according to the first time-domain resource location corresponding to the PUSCH of uplink scheduling.

7. A method for determining a time-domain resource of uplink transmission, comprising:
determining, by a terminal device, a target time slot offset used for uplink scheduling based on whether the terminal device has a timing advance (TA) pre-compensation capability;
in a case where the terminal device is applied to a two-step random access, the method further comprising:
receiving, by the terminal device, a second common time slot offset, a second common TA, and a second TA adjustment amount sent by a network device; wherein the second TA adjustment amount is a TA adjustment amount determined by the network device based on a reception of a message A sent by the terminal device;

wherein the determining, by a terminal device, a target time slot offset used for uplink scheduling based on whether the terminal device has a TA pre-compensation capability comprises:
determining, by the terminal device, a sum of a second estimated TA and the second TA adjustment amount as the target time slot offset used for uplink scheduling, in condition of the terminal device having the TA pre-compensation capability and the second estimated TA being uploaded in the message A;
determining, by the terminal device, the second common time slot offset as the target time slot offset used for uplink scheduling, in condition of the terminal device having the TA pre-compensation capability and the second estimated TA not being uploaded in the message A; and
determining, by the terminal device, a sum of the second common TA and the second TA adjustment amount as the target time slot offset used for uplink scheduling, in condition of the terminal device not having the TA pre-compensation capability;
wherein the method further comprises:
receiving, by the terminal device, a second time slot offset sent by the network device; wherein the second time slot offset is determined by the network device based on the target time slot offset used by the terminal device;
wherein the second time slot offset is an increment determined by the network device relative to a TA actually used by the terminal device when sending the uplink transmission scheduled by a message B, in condition of the terminal device having the TA pre-compensation capability and the second estimated TA being uploaded in the message A;
the second time slot offset is an increment determined by the network device relative to the second common time slot offset, in condition of the terminal device having the TA pre-compensation capability and the second estimated TA not being uploaded in the message A; and
the second time slot offset is an increment determined by the network device relative to the TA actually used by the terminal device when sending the uplink transmission scheduled by the message B, in condition of the terminal device not having the TA pre-compensation capability;
wherein the method further comprises:
determining, by the terminal device, a second time-domain resource location of uplink scheduling;
wherein the determining, by the terminal device, a second time-domain resource location of uplink scheduling comprises:
determining, by the terminal device, the second time-domain resource location of uplink scheduling based on a second time slot number, the second time slot offset, the second estimated TA, the second TA adjustment amount, and $\Delta_2$, in condition of the terminal device having the TA pre-compensation capability and the second estimated TA being uploaded in the message A;
determining, by the terminal device, the second time-domain resource location of uplink scheduling based on the second time slot number, the second time slot offset, the second common time slot offset, and $\Delta_2$, in condition of the terminal device having the TA pre-compensation capability and the second estimated TA not being uploaded in the message A; and determining, by the terminal device, the second time-domain resource location of uplink scheduling based on the second time slot number, the second time slot offset, the second common TA, the second TA adjustment amount, and $\Delta_2$, in condition of the terminal device not having the TA pre-compensation capability;
wherein the second time slot number is a downlink time slot number corresponding to a physical downlink shared channel (PDSCH) of the terminal device receiving a message B; a value of $\Delta_2$ is taken with respect to an uplink subcarrier interval.

8. The method according to claim 7, further comprising:
receiving, by the terminal device, a third random access channel (RACH) resource set and a fourth RACH resource set sent by the network device; wherein the third RACH resource set is configured for the terminal device having the TA pre-compensation capability to send the message A, and the fourth RACH resource set is configured for the terminal device not having the TA pre-compensation capability to send the message A; and
sending, by the terminal device, the message A to the network device with the third RACH resource set or the fourth RACH resource set depending on whether the terminal device has the TA pre-compensation capability.

9. The method according to claim 8, wherein the sending, by the terminal device, the message A to the network device with the third RACH resource set or the fourth RACH resource set depending on whether the terminal device has the TA pre-compensation capability comprises:
performing, by the terminal device, TA compensation with the second estimated TA, selecting, by the terminal device, a RACH resource from the third RACH resource set, and sending, by the terminal device, the message A to the network device, in condition of the terminal device having the TA pre-compensation capability; wherein the message A carries the second estimated TA;
performing, by the terminal device, TA compensation with the second estimated TA, selecting, by the terminal device, a RACH resource from the third RACH resource set, and sending, by the terminal device, the message A to the network device, in condition of the terminal device having the TA pre-compensation capability; wherein the message A does not carry the second estimated TA; and
performing, by the terminal device, TA compensation with the second common TA, selecting, by the terminal device, a RACH resource from the fourth RACH resource set, and sending, by the terminal device, the message A to the network device, in condition of the terminal device not having the TA pre-compensation capability.

10. The method according to claim 7, wherein,
the determining, by the terminal device, the second time-domain resource location of uplink scheduling based on a second time slot number, the second time slot offset, the second estimated TA, the second TA adjustment amount, and $\Delta_2$ comprises:
determining, by the terminal device, a sum of the second time slot number, the second time slot offset, the second estimated TA, the second TA adjustment amount, and $\Delta_2$ as the second time-domain resource location corresponding to a physical uplink shared channel (PUSCH) of uplink scheduling;

the determining, by the terminal device, the second time-domain resource location of uplink scheduling based on the second time slot number, the second time slot offset, the second common time slot offset, and $\Delta_2$ comprises:
 determining, by the terminal device, a sum of the second time slot number, the second time slot offset, the second common time slot offset, and $\Delta_2$ as the second time-domain resource location corresponding to the PUSCH of uplink scheduling; and the determining, by the terminal device, the second time-domain resource location of uplink scheduling based on the second time slot number, the second time slot offset, the second common TA, the second TA adjustment amount, and $\Delta_2$ comprises:
 determining, by the terminal device, a sum of the second time slot number, the second time slot offset, the second common TA, the second TA adjustment amount, and $\Delta_2$ as the second time-domain resource location corresponding to the PUSCH of uplink scheduling.

11. The method according to claim 10, further comprising:
 sending, by the terminal device, the message B according to the second time-domain resource location corresponding to the PUSCH of uplink scheduling.

12. A non-transitory computer-readable storage medium, comprising an instruction; wherein when the instruction is executed on a computer, the computer is caused to perform:
 determining, by a terminal device, a target time slot offset used for uplink scheduling based on whether the terminal device has a timing advance (TA) pre-compensation capability;
 in a case where the terminal device is applied to a four-step random access, the instruction further comprising:
  receiving, by the terminal device, a first common time slot offset, a first common TA, and a first TA adjustment amount sent by a network device; wherein the first TA adjustment amount is a TA adjustment amount determined by the network device based on a reception of a message 1 sent by the terminal device;
 wherein the determining, by a terminal device, a target time slot offset used for uplink scheduling based on whether the terminal device has a TA pre-compensation capability comprises:
  determining, by the terminal device, the first common time slot offset as the target time slot offset used for uplink scheduling in condition of the terminal device having the TA pre-compensation capability; and
  determining, by the terminal device, a sum of the first common TA and the first TA adjustment amount as the target time slot offset used for uplink scheduling in condition of the terminal device not having the TA pre-compensation capability;

wherein the instruction further comprises:
 receiving, by the terminal device, a first time slot offset sent by the network device;
wherein the first time slot offset is determined by the network device based on the target time slot offset used by the terminal device;
 wherein the first time slot offset is an increment determined by the network device relative to the first common time slot offset in condition of the terminal device having the TA pre-compensation capability; and
 the first time slot offset is an increment determined by the network device relative to a TA actually used by the terminal device when sending a message 3 in condition of the terminal device not having the TA pre-compensation capability;

wherein the instruction further comprises:
 determining, by the terminal device, a first time-domain resource location of uplink scheduling;
 wherein the determining, by the terminal device, a first time-domain resource location of uplink scheduling comprises:
  determining, by the terminal device, the first time-domain resource location of uplink scheduling based on a first time slot number, the first time slot offset, the first common time slot offset, and $\Delta_1$, in condition of the terminal device having the TA pre-compensation capability; and
  determining, by the terminal device, the first time-domain resource location of uplink scheduling based on the first time slot number, the first time slot offset, the first common TA, the first TA adjustment amount, and $\Delta_1$, in condition of the terminal device not having the TA pre-compensation capability;

wherein the first time slot number is a downlink time slot number corresponding to a physical downlink shared channel (PDSCH) of the terminal device receiving a message 2; a value of $\Delta_1$ is taken with respect to an uplink subcarrier interval.

* * * * *